(12) United States Patent   (10) Patent No.: US 8,355,946 B2
Hammond et al.   (45) Date of Patent: Jan. 15, 2013

(54) SYSTEMS AND METHODS FOR DETERMINING WHETHER TO OFFER A REWARD AT A POINT OF RETURN

(75) Inventors: Mark S. Hammond, Dana Point, CA (US); Peter L. Bradshaw, San Clemente, CA (US)

(73) Assignee: The Retail Equation, Inc., Irvine, CA (US)

( * ) Notice: Subject to any disclaimer, the term of this patent is extended or adjusted under 35 U.S.C. 154(b) by 364 days.

(21) Appl. No.: 11/691,458

(22) Filed: Mar. 26, 2007

(65) Prior Publication Data

US 2007/0156533 A1  Jul. 5, 2007

Related U.S. Application Data

(63) Continuation of application No. 11/331,850, filed on Jan. 13, 2006, now abandoned.

(60) Provisional application No. 60/672,322, filed on Apr. 18, 2005, provisional application No. 60/673,566, filed on Apr. 21, 2005.

(51) Int. Cl.
  *G06Q 30/00*  (2006.01)
  *G07G 1/14*  (2006.01)
(52) U.S. Cl. ..................................... 705/14.1; 704/14.4
(58) Field of Classification Search .................. 705/14.1, 705/14.4
  See application file for complete search history.

(56) References Cited

U.S. PATENT DOCUMENTS

| | | | | |
|---|---|---|---|---|
| 5,687,322 | A | * | 11/1997 | Deaton et al. ............... 705/14.25 |
| 5,832,458 | A | | 11/1998 | Jones |
| 6,016,480 | A | * | 1/2000 | Houvener et al. ................ 705/21 |
| 6,536,659 | B1 | | 3/2003 | Hauser et al. |
| 6,834,268 | B2 | | 12/2004 | Junger |
| 6,975,205 | B1 | | 12/2005 | French et al. |
| 7,076,449 | B2 | | 7/2006 | Tsunenari et al. |
| 7,149,530 | B1 | | 12/2006 | Arakawa et al. |

(Continued)

FOREIGN PATENT DOCUMENTS

CN   1416084   * 5/2003

(Continued)

OTHER PUBLICATIONS

Screenshots of TheReturnExchange.com dated Apr. 18, 2004 and prior taken from Archive.org.*

(Continued)

*Primary Examiner* — Arthur Duran
(74) *Attorney, Agent, or Firm* — Knobbe, Martens, Olson & Bear, LLP

(57) ABSTRACT

Computerized decision-making systems and methods are described for determining whether to provide one or more rewards, such as a coupon or instant discount, to a customer requesting to make a merchandise return at a store, and, if so, to determine the terms of the reward, such as value, expiration date/time and other terms that may be associated with a coupon. The reward determinations may be implemented in conjunction with a system for authorizing the requested merchandise return transaction. Information about the requested return may be used together with data about the customer's past purchase, return transactions, and other customer-related data. In some embodiments, the determinations are based, at least in part, on store-related information and policies. The reward may be printed with a receipt issued to the customer at the point of return and/or may be provided to the customer using a wide variety of other communications technologies.

10 Claims, 12 Drawing Sheets

U.S. PATENT DOCUMENTS

| | | | |
|---|---|---|---|
| 7,455,226 B1 | 11/2008 | Hammond et al. | |
| 7,831,467 B1 * | 11/2010 | Lefebvre et al. | 705/14.1 |
| 2001/0032125 A1 * | 10/2001 | Bhan et al. | 705/14 |
| 2001/0037207 A1 * | 11/2001 | Dejaeger | 705/1 |
| 2001/0041988 A1 * | 11/2001 | Lin | 705/1 |
| 2002/0010629 A1 | 1/2002 | Diamond | |
| 2002/0052818 A1 | 5/2002 | Loveland | |
| 2002/0072956 A1 | 6/2002 | Willems et al. | |
| 2002/0161641 A1 * | 10/2002 | Quinlan et al. | 705/14 |
| 2003/0004798 A1 * | 1/2003 | McAuliffe et al. | 705/14 |
| 2003/0023482 A1 * | 1/2003 | Messner et al. | 705/14 |
| 2003/0110311 A1 * | 6/2003 | Kumar | 709/320 |
| 2003/0233278 A1 * | 12/2003 | Marshall | 705/14 |
| 2004/0039679 A1 | 2/2004 | Norton et al. | |
| 2004/0069661 A1 * | 4/2004 | Telleen | 206/232 |
| 2004/0088219 A1 * | 5/2004 | Sanders et al. | 705/14 |
| 2004/0128265 A1 | 7/2004 | Holtz et al. | |
| 2004/0172260 A1 | 9/2004 | Junger et al. | |
| 2004/0260608 A1 | 12/2004 | Lewis et al. | |
| 2005/0071228 A1 | 3/2005 | Bortolin et al. | |
| 2005/0131761 A1 * | 6/2005 | Trika et al. | 705/14 |
| 2005/0222904 A1 | 10/2005 | Cotten et al. | |
| 2005/0234771 A1 | 10/2005 | Register et al. | |
| 2005/0278215 A1 | 12/2005 | Seele Jr. | |
| 2006/0149577 A1 * | 7/2006 | Stashluk et al. | 705/1 |
| 2006/0155603 A1 * | 7/2006 | Abendroth et al. | 705/14 |
| 2006/0235746 A1 | 10/2006 | Hammond et al. | |
| 2006/0235747 A1 | 10/2006 | Hammond et al. | |
| 2006/0242011 A1 | 10/2006 | Bell et al. | |
| 2006/0253453 A1 * | 11/2006 | Chmaytelli et al. | 707/10 |
| 2006/0259262 A1 | 11/2006 | Kuehnrich | |
| 2007/0156533 A1 | 7/2007 | Hammond et al. | |
| 2008/0065485 A1 | 3/2008 | Hammond et al. | |
| 2009/0076870 A1 | 3/2009 | Hammond et al. | |
| 2011/0173112 A1 * | 7/2011 | Cotton | 705/35 |

FOREIGN PATENT DOCUMENTS

| | | | |
|---|---|---|---|
| CN | 1416084 A | | 5/2003 |
| WO | WO 2005029284 A2 * | | 3/2005 |

OTHER PUBLICATIONS

International Search Report from International Application No. PCT/US06/13431, dated Feb. 11, 2008.

International Search Report from PCT/US07/76693, mailed Sep. 15, 2008.

"Capturing the Power of the POS", Chain Store Age. 06/00, vol. 76, Issue 6, p. 4A, New York.

Aggarwal et al., "Predictors of Mortality and Resource Utilization in Cirrhotic Patients Admitted to the Medical ICU", Chest, May 05, 2001, vol. 119, pp. 1489-1497.

Anonymous "Capturing the Power of the POS," Chain Store Age. 06/00, vol. 76, Issue 6, p. 4A, New York.

Anonymous, "Profitable Solutions for Returns Management," 10 pages, downloaded from www.thereturnexchange.com (Internet archive documents) on Mar. 14, 2009, 2000-2001.

Chapter 2: Managing Returns, available online at http://www.planitroi.com/web/Gatekeeping with Returns Management.pdf , retrieved on Dec. 13, 2006.

Hammon et al., U.S. Appl. No. 11/264469.

Heller, "High Cost of Returns Prompts Industry Cooperation," Discount Store News, Oct. 5, 1998, vol. 37, Issue 19, p. 4.

International Preliminary Report on Patentability for International Application No. PCT/US06/13431(Our Reference: Retex.009VPC).

International Preliminary Report on Patentability for International Application No. PCT/US07/076693.

Milliot, "Returning to the Returns Question", Publishers Weekly, Jun. 22, 1998, vol. 245, Issue 25; p. 48, New York.

Rogers and Tibben-Lemke, Chapter 2: Managing Returns, available online at http://www.planitroi.com/web/Gatekeeping with Returns, pp. 37-71, Management.pdf , retrieved on Dec. 13, 2006.

Su, et al., "A Manufacturer's Optimal Quantity Discount Strategy and Return Policy Through Game-Theoretic Approach," Journal of the Operational Research Society, Aug. 2002, vol. 53, No. 8, UK.

\* cited by examiner

FIG. 5C

SYSTEMS AND METHODS FOR DETERMINING WHETHER TO OFFER A REWARD AT A POINT OF RETURN

PRIORITY CLAIMS

This application is a continuation of U.S. application Ser. No. 11/331,850, filed on Jan. 13, 2006, which claims the benefit of priority under 35 U.S.C. §119(e) of U.S. Provisional Application No. 60/672,322, filed on Apr. 18, 2005 and titled SYSTEM FOR COLLECTING, ANALYZING, AND MAKING DECISIONS ON CONSUMER RETAIL DATA, and of U.S. Provisional Application No. 60/673,566, filed on Apr. 21, 2005 and titled SMART COUPONS, the entireties of which are incorporated herein by reference.

FIELD OF THE INVENTION

The invention relates to offering rewards at a point of return.

BACKGROUND OF THE INVENTION

Many retail merchants have found that customers appreciate shopping at a store with a liberal merchandise return acceptance policy. However, implementing a liberal return acceptance policy may significantly decrease the store's profitability when existing sales are rescinded and returned merchandise may need to be re-sold at a discount, if it is sold again at all. Merchants would therefore like to provide the desired liberal return acceptance policy while reducing loss of sales.

Furthermore, many merchants have found that customers who make returns often do not soon shop again at the store. For example, one study of consumer behavior at a number of retail stores found that less than 15% of customers who returned merchandise made another purchase at the store within the next thirty days, and that over 50% of customers who returned merchandise did not make any other purchase at the store within the next eighteen months. These figures can be explained in part by customers who are unhappy with the merchandise purchased at the store and who may be disgruntled with the store as a whole. The figures may also be explained in part by shoppers who are returning gifts purchased by others or who may be otherwise in the store for the first time. Merchants would like to encourage both of these types of customers, as well as others, to shop in their stores and to become long-term customers, especially if it can be determined that they are not engaging in merchandise return activity that is fraudulent or abusive of store return policies. Currently, there is little, if any, incentive offered to a customer at the merchant's point of return to reconsider making a return, to immediately use any returned funds to re-purchase at the merchant's store, or to otherwise make another purchase within a defined span of time.

SUMMARY OF THE INVENTION

Computerized decision-making systems and methods are described for determining whether to provide one or more coupons or other rebates or rewards to a customer requesting to make a merchandise return at a store, and, if so, to determine the terms of the reward, such as value of a coupon, expiration date/time and other limitations and/or options that may be included. Such coupons, especially if valid for only a very short duration, may encourage a customer who has made a merchandise return to make another purchase in the store before leaving. Furthermore, since research has indicated that as much as 70% of shopping decisions are made inside the store, coupons offered in-store may be especially effective in generating additional sales. The reward determination may be implemented in conjunction with a system for authorizing the requested merchandise return transaction. Embodiments of the systems and methods may intelligently identify customers whose return and purchase behavior indicates that they are "good" customers and tailor the coupon offering or other reward for the identified customers. In various embodiments, information about the requested return may be used together with data about the customer's past purchase and return transactions, as well as other customer-related data. In some embodiments, the determinations are based, at least in part, on current store conditions and policies, or on other store-related information. The reward may be printed on a receipt issued to the customer at the point of return and/or may be provided to the customer using a wide variety of other communications technologies Embodiments are described of a computerized method of determining whether to offer a reward to a customer in association with a requested merchandise return transaction at a merchant's point of return. The method comprises: receiving information about the requested merchandise return transaction and using at least a portion of the merchandise return transaction information to determine whether to offer the customer a reward at the point of return.

Embodiments of a method of processing a requested merchandise return are described. The method comprises receiving information about a merchandise return requested by a customer, wherein the information is received from a merchant's point of return. The method further comprises using a computerized system to determine whether to issue a reward to the customer, and if a reward is to be issued, transmitting information about the reward to the point of return.

Embodiments of a computerized system for processing merchandise returns are described. The system comprises a processor communicatively coupled to a merchant's point of return, wherein the processor is configured to receive information about a merchandise return requested by a customer at the merchant's point of return. The system further comprises a decision engine configured to receive the information about the merchandise return and to determine whether to issue a coupon in association with the merchandise returns, based, at least in part, on the information.

Embodiments of a system for processing a merchandise return are described. The system comprises: means for receiving from a merchant's point of return information about a requested customer merchandise return, means for using a computerized system to determine whether to issue a reward to the customer, and if a reward is to be issued, means for transmitting information about the reward to the point of return.

For purposes of summarizing embodiments of the invention, certain aspects, advantages, and novel features of the invention have been described herein. It is to be understood that not necessarily all such aspects, advantages, or novel features will be embodied in any particular embodiment of the invention.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention.

Throughout the drawings, reference numbers are re-used to indicate correspondence between referenced elements. In addition, the first digit of each reference number indicates the figure in which the element first appears.

FIGS. 5A-5C depict embodiments of coupons that may be issued at a point of return.

DETAILED DESCRIPTION OF THE PREFERRED EMBODIMENTS

Embodiments of computer-implemented systems and methods are described that provide rewards to customers who are requesting to return merchandise at a point of return at a merchant establishment.

Figure 1:
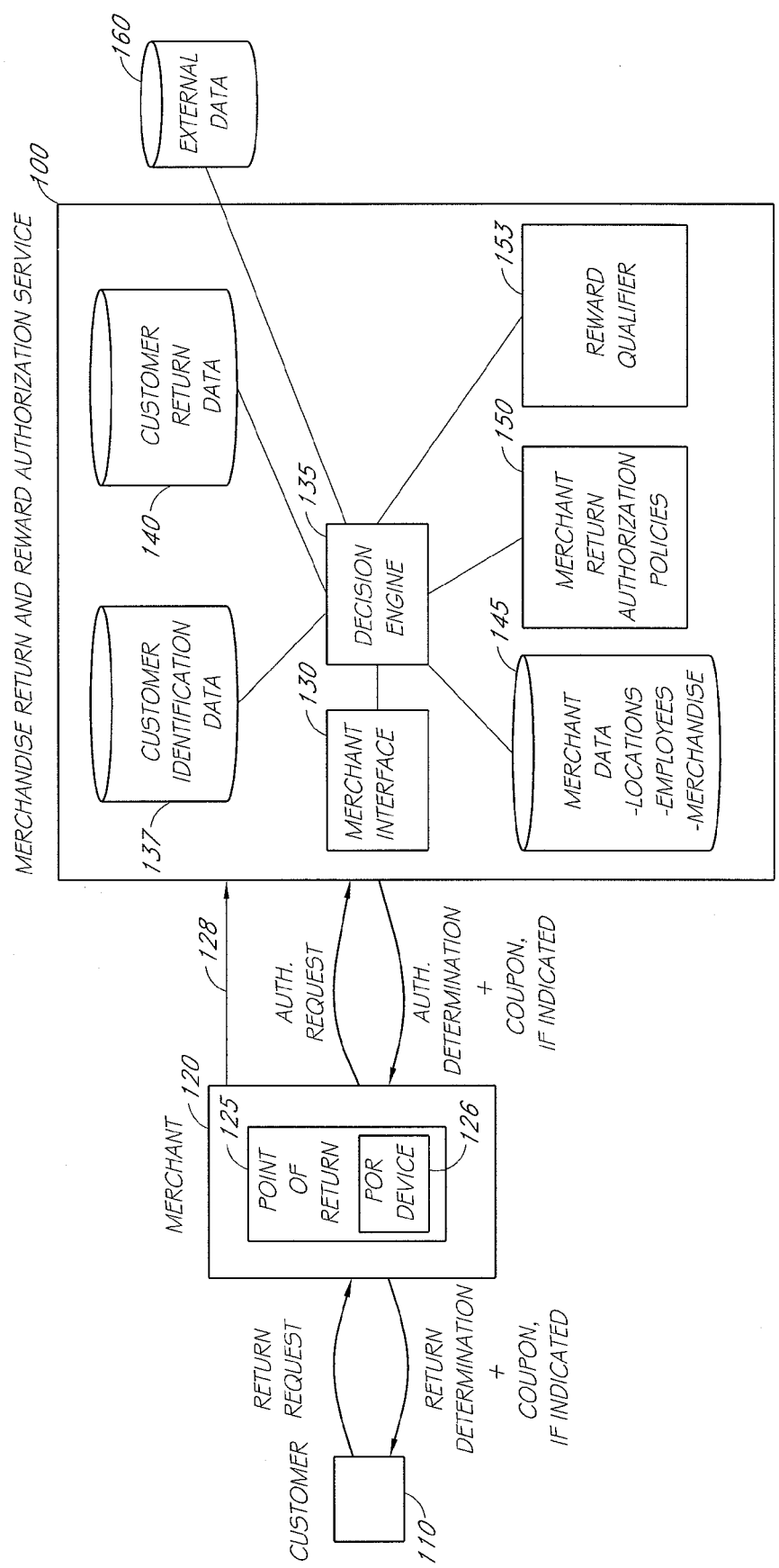
FIG. 1 is a block diagram depicting one embodiment of a merchandise point of return system.

FIG. 1 is a block diagram depicting one embodiment of a system for issuing rewards at a merchant's point of return. A customer 110 who wishes to return previously purchased merchandise brings the merchandise to a point of return 125 at a merchant establishment 120 and requests to receive an equivalent dollar amount of either cash, credit, merchandise, or some combination or equivalent thereof.

In some embodiments, the customer 110 may be offered an incentive not to return the merchandise. For example, the customer 110 may be offered an "instant discount", a coupon, or other reward in exchange for agreeing not to return the merchandise. In various embodiments, an "instant discount" is a rebated amount of cash, credit, or other tender that the merchant 120 provides to the customer 110, either directly, into an account associated with the customer 110, as a store credit, or the like. The amount of the instant discount may be based, for example, on the original purchase price or current purchase price of the merchandise that the customer requested to return, such as an instant discount of 10% or 15% of the purchase price. The payment of such an instant discount to the customer may allow the merchant to avoid even higher costs associated with acceptance of the return.

The merchant 120 may additionally or alternatively offer the customer 110 a coupon, valid for an immediate purchase or good towards a future purchase, as an incentive not to make the return. In some embodiments, the customer 110 may be offered the choice of receiving an instant discount or a coupon as a reward for discontinuing the requested return. In some embodiments, the customer 110 may be offered both the instant discount and the coupon. In some embodiments, the customer 110 may be offered another type of reward as an incentive. In some embodiments, customers requesting returns may be allowed to accept an incentive even if the customer decides to make the return.

If the customer 110 decides to go ahead with the merchandise return, a clerk at the point of return 125 may offer the customer 110 a coupon. Such a coupon may foster goodwill towards the merchant 120 on the part of the customer 110; the coupon may also encourage the customer to make another purchase.

In some embodiments, as will be described in greater detail below, the merchant may make use of a computerized rewards authorization system to assess a likelihood of fraudulent behavior on the part of the customer 110 and/or to select terms for an instant discount, a coupon, or other reward being offered to the customer 110. A computerized rewards authorization system may also be used to track information about rewards that have been offered to customers. Such rewards may be issued selectively and/or may be customized to the customer and store, based on a wide variety of factors, as will be described in detail with reference to FIG. 6 to follow. Alternatively, the rewards may be issued to all customers requesting to make merchandise returns, or, may be issued on a random basis.

As depicted in FIG. 1, aspects of the system for issuing rewards at a point of return may be carried out by a service provider that also provides merchant return transaction authorization services. Thus, in some embodiments, some or all of the information that may be gathered and analyzed for purposes of authorizing a requested merchandise return may also be used, either alone or in combination with other information, to determine whether to provide a reward to a customer at a point of return 125, and, if so, to determine what type of reward to offer. Such a service is referred to with reference to the embodiment depicted in FIG. 1 as a merchandise return and reward authorization service 100. However, it should be understood that, in other embodiments, the reward-related systems and methods described herein may be carried out by another embodiment of a reward authorization service 100, such as a provider that makes automated return-related coupon determinations, but that does not make risk assessments or other determinations regarding the acceptance, denial, or authorization terms of merchandise return transactions requested by customers. In some embodiments, for example, rewards may be provided to randomly selected customers who are requesting to make merchandise returns. Alternatively, the systems and methods described herein may be used to provide incentives, in the form of return-related rewards, to customers not to make returns. Thus, the description of the coupon-related systems and methods carried out in conjunction with various return authorization systems and methods is intended as an example for purposes of illustration only and is not intended to limit the scope of the reward-related systems and methods described herein.

In some embodiments, a clerk processing the return may send data about the requested return transaction to a merchandise return and reward authorization service 100 and may receive in response a return authorization determination that instructs the clerk to either accept or deny the return transaction. The clerk may offer the customer 110 a coupon, as will be described in greater detail, either in response to the authorization determination received for the requested transaction, or as part of a return transaction that does not include an authorization determination. In some embodiments, the merchandise return and reward authorization service 100 may randomly select customers requesting merchandise returns to whom to issue a coupon.

The point of return 125 may be a desk or location within the merchant establishment 120 that is dedicated for processing merchandise returns. Alternatively, the point of return 125 may be a normal cashier's station that may be additionally used for processing purchases and other types of business transactions, or the point of return 125 may be another location.

In still other embodiments, especially where the merchant is operating via the Internet or other online or electronic system, or in association with a television-based or telephone-based merchant system, the point of return 125 may not be at a specified physical location. For example, for an Internet-based retailer operating over the World Wide Web, the point of return 125 may be embodied as part or all of a web page that can be used by customers to transact some or all of a merchandise return process. As another example, in conjunction with a phone-based merchant system, a customer may transact some or all of a merchandise return process by using a telephone keypad and/or interactive voice response (IVR) system to access a portion of the merchant's system that serves as the merchant's point of return 125. Embodiments of the point of return coupon system described herein may be carried out at any of these or other physical or non-physical types of merchant points of return 125.

For purposes of this disclosure, the systems and methods described herein will frequently be described with reference to a clerk or other merchant employee who receives a merchandise return request from a customer 110 and who accepts or denies the return request, based, at least in part, on a recommendation received from one or more of the systems and methods described herein and who may offer a coupon or other reward to a customer according to systems and methods described herein. In various embodiments, the actions that are attributed to the clerk may alternatively or additionally be carried out by another type of merchant employee or representative, or other person authorized to handle the merchandise return, or by an automated process or system or apparatus configured to process the return request and/or the coupon distribution. Thus, while, for ease of description, the systems and methods will be described with reference to a clerk at a point of return 125, it should be understood that embodiments of the systems and methods may also be carried out with one or more of the above-listed, or other, clerk alternatives.

The clerk may use an automated point of return (POR) device 126 for processing the requested merchandise return. In various embodiments, the POR device 126 may be used to input information about the requested return and to provide a clerk with authorization information for the return. The POR device 126 may also provide a recommendation to the clerk to offer the customer an "instant discount" as an incentive not to make the merchandise return. The POR device 126 may also be used to provide a coupon to be presented to the customer who is making a return. In various embodiments, the POR device 126 may print the coupon for offering to the customer, may instruct another device to print the coupon, may electronically enter data about the coupon to a loyalty or other store-related card or data storage medium, may instruct a clerk to provide or not to provide a pre-printed coupon to the customer, or may participate in another form in the process to provide coupons to customers at a point of return 125.

In some embodiments, the POR device 126 may be a device that is dedicated for use with merchandise returns and may be used in association with the systems and methods described herein. One embodiment of such a dedicated POR device 126 is described with reference to FIG. 3 below. In other embodiments, the dedicated POR device 126 is at least one of: a hand-held device, a wireless device, a telephone-assisted device, a self-serve kiosk, an assisted-return kiosk, or other suitable apparatus.

In some embodiments, rather than using a dedicated POR device 126, a multi-functional check-out terminal or other computerized device may be configured to provide some or all of the functionality associated with the POR device 126 described herein. In some embodiments, more than one device may be used to provide some or all of the functionality described herein for the POR device 126. For example, an auxiliary printing device or other distribution device may be used in conjunction with the POR device 126 to provide one or more coupons to a customer at a POR 125. Thus, while the systems and methods described herein may be described with reference to a dedicated POR device 126, it is to be understood that a wide variety of dedicated and/or multi-purpose POR devices 126 may be used, alone or in combination, without departing from the spirit of the invention as described herein.

As depicted in FIG. 1, authorization determination for the customer's requested return and/or determination of whether to provide a reward may be handled by an automated merchandise return and reward authorization service 100. The merchandise return and reward authorization service 100 may accept information input by the clerk at the point of return 125 and use various types of information associated with the requested return in order to implement the merchant's 120 return policy to assess risk of exposure to fraudulent, abusive, or unprofitable behavior that may be associated with accepting the requested return and to determine whether to offer a reward to the customer.

Additional store-related information 128 that may not be directly related to the current return transaction may be received by the merchandise return and reward authorization service 100 from the merchant 120. For example, information about inventory, marketing promotions, sales transactions, other reward programs, customers' purchase and return histories, information on the return rates of specific items, and the like may be sent by the merchant 120, or by another entity on behalf of the merchant 120 to the merchandise return and reward authorization service 100. Additionally or alternatively, information about the merchant's merchandise mix, mix of sales by SKU identifier, mix of inventory by SKU identifier, store sales performance, store profitability, average sale amount for the store, average return amount for the store, current coupon promotions, current sales promotions, store location, and local demographics may be provided to the merchandise return and reward authorization service 100. The store-related information 128 may be sent nightly, weekly, on an as-need basis, on a continual basis, or at another convenient schedule.

In some embodiments, the merchandise return and reward authorization service 100 may be implemented, as depicted in FIG. 1, as an entity external to the merchant 120 whose services are contracted or otherwise provided to the merchant 120. Additionally or alternatively, some or all of the merchandise return and reward authorization service 100 may be implemented as one or more software and/or hardware components under the operation of the merchant 120 that function in the POR device 126 and/or within one or more computer devices at the point of return 125, at another location within the same physical merchant establishment and/or at a geographically removed location used by the merchant 120. Thus, although the systems and methods described herein are most often described in association with an external merchandise return and reward authorization service 100, it is to be understood that any combination of these or other implementation arrangements may be used without departing from the spirit of the invention described herein.

In embodiments where the merchandise return and reward authorization service 100 is a separate entity that authorizes requested returns presented to the merchant 120 and that makes reward-related determinations, communication between the merchant's point of return 125 and the merchandise return and reward authorization service 100 may be carried out using any of a wide variety of appropriate devices and/or communications and data security technologies. For example, the communications between a computerized device at the merchant's point of return 125 and a merchant interface 130 at the merchandise return and reward authorization service 100 may be carried out using the Internet or other global network. In other embodiments, the communications may be carried out using any communication system including by way of example, dedicated communication lines, telephone networks, wireless data transmission systems, two-way cable systems, customized computer networks, interactive kiosk networks, automatic teller machine-type networks, interactive television networks, and the like.

In various embodiments, the clerk handling the requested return uses the POR device 126 to send information about an authorization request to the merchandise return and reward authorization service 100. The merchandise return and reward authorization service 100 receives the information from the POR device 126, as well as the store-related information 128 from the merchant 120, and uses the information, together with other stored information, to make an authorization determination for the requested merchandise return, assessing the risk of accepting the return and implementing merchant return policy preferences to recommend either that the clerk accept the requested return, refuse to accept the requested return, or take another course of action. The merchandise return and reward authorization service 100 further uses at least some of the information received from the POR device 126 and the store-related data 128 to determine whether to issue a reward to the customer and, if so, to determine terms associated with the reward.

The embodiment of the merchandise return and reward authorization service 100 that is depicted in FIG. 1 includes a merchant interface 130, a decision engine 135, a customer identification data repository 137, a customer return data repository 140, a merchant data repository 145, a repository of merchant return authorization policies 150, and a reward qualifier 153. Other embodiments of the merchandise return and reward authorization service 100 may include other components and/or a subset of these components. Furthermore, some or all of the components 130, 135, 137, 140, 145, 150, 153 may be implemented, in whole or in part, in one or more locations remote from the merchandise return and reward authorization service 100 and/or under the management of entities other than the merchandise return and reward authorization service 100. Some embodiments of the merchandise return and reward authorization service 100 may include only the decision engine 135 and may access some or all of the functions and data content available from the other modules 130, 137, 140, 145, 150, 153 from other external sources. For example, a database of coupon-related information may be provided by a third-party or other source and may include coupon-related information, such as, for example, who received coupons, instant discounts, or other return-related rewards, at what merchant they were received, whether or not the coupons were redeemed, whether merchandise purchased with a coupon was subsequently returned, and the like.

The merchant interface 130 receives an authorization request from the merchant point of return device 126 and accepts information about the requested merchandise return sent from the POR device 126. The received information is sent to a decision engine 135 for determining whether to offer a coupon and for assessing risk associated with accepting the requested merchandise return and for making an authorization determination that is based on the assessed risk as well as on stored information about the merchant's return authorization policies 150. The return policy 150 may be implemented in a variety of computer-usable forms, including, but not limited to, rule-based systems, decision trees, scorecard systems, and the like. In various embodiments, the decision engine 135 may assess the requested return transaction with reference to one or more threshold conditions, such as an acceptable score. In some score-based embodiments, in which, for example, a high score indicates low authorization risk, if the requested return transaction meets or exceeds the threshold, the return is accepted, while if the requested return does not meet the threshold, the return is denied. In other embodiments, other methods of assessing whether to accept the requested return may alternatively or additionally be used.

In various embodiments, the decision engine 135, in conjunction with the reward qualifier 153, determines whether or not to issue a coupon for use by a customer at a point of return, and, if yes, determines terms to be included on the coupon, such as a percentage or dollar amount discount offered by the coupon, duration of validity, limitations based on eligible products, departments, or merchants, whether or not the coupon may be used online or in a physical store or both, and the like.

In some embodiments, a determination whether to offer a coupon at the point of return is carried out separately from the return authorization, if one exists. In other embodiments, once the decision engine 135 has made a return authorization determination, the decision engine 135 invokes the reward qualifier 153 as a sub-process, requesting that the reward qualifier 153 make the coupon-related determination and report back to the decision engine 135, so that the decision engine 135 may forward the coupon-related result, together with the return authorization determination, to the point of return 125.

In various embodiments, the decision engine 135 and the reward qualifier 153 may be configured in a wide variety of configurations that allow the decision engine 135 and the reward qualifier 153 to cooperate to carry out the decision-making functions described herein. In some embodiments, the reward qualifier 153 is implemented as a set of rules or policies that are carried out by the decision engine 135. In some embodiments, the reward qualifier 153 is implemented as a component with decision-making capabilities that can execute coupon-related determinations separately from the decision engine 135.

Functions performed by or in conjunction with the reward qualifier 153 may be carried out in any of a wide variety of suitable, computer-implemented forms, such as a decision tree, an expert system, or other ruled-based decision system, as a linear calculation or other scoring mechanism, or as a form of probabilistic or neural network, genetic, or other statistical model or algorithm for decision-making. A more detailed description of factors that may be used by the decision engine 135 and/or reward qualifier 153 to make a return authorization determination and/or to determine whether to issue a coupon associated with the requested return as well as determining terms associated with an issued coupon will be provided with reference to FIG. 6 to follow.

The decision engine 135 and/or reward qualifier 153 may use information from one or more other repositories of data collected and maintained by the merchandise return and reward authorization service 100, or from one or more external merchant or non-merchant data sources 160.

For example, in addition or as an alternative to the store-related data 128 received from the merchant 120, the decision engine 135 and/or reward qualifier 153 may access stored merchant data 145 that may include any of a wide variety of types of information associated with the merchant 120, including, but not limited to: information about current sales promotions, information about current inventory, and other information that might influence a retailer's decision to offer a coupon to a consumer.

In addition, the stored merchant data 145 may contain: information about the location(s) of the merchant's stores or other establishments, information about the merchant's employees (including names, identification numbers, hire dates, home addresses, past association with proper, fraudulent, and/or questionable merchandise returns, and the like), and information about the merchant's 120 inventory of merchandise.

The decision engine 135 and/or reward qualifier 153 may use information stored in a repository of customer identification data 137. The repository of customer identification data 137 may store information about a large number of customers, including, for example, information about customer names, addresses, identification numbers, such as driver's license and other identification numbers, biometric identification information, and the like. This information may be used in an effort to positively identify the customer 110 and/or to correlate data about the customer received from other sources.

The decision engine 135 and/or reward qualifier 153 may also use information from one or more repositories of customer return data 140, which include a wide variety of information about past merchandise return activity associated with the individual customers 110, including past coupon-related activity. Some examples of information associated with past purchase and return transactions are described in greater detail with reference to FIG. 6 below. In some embodiments, the customer return data repository 140 may also include information about the customer's 110 purchase history. Using the customer identification data 137 and the customer return data 140 allows the decision engine 135 and/or reward qualifier 153 to link information about past merchandise purchase and/or return activity with the customer 110 requesting the return at the point of return 125. Such information allows the decision engine 135 and the reward qualifier 153, among other capabilities, to assess the customer's product preferences, return and purchase patterns, and past coupon use patterns. In various embodiments, this information may be used by the decision engine 135 and/or the reward qualifier 153 to determine whether to provide a coupon as well as to identify coupon terms that are expected to appeal to the customer and further the merchant's business goals.

In some embodiments, a "negative file," such as a listing of customers 110 who are known to have been involved with past fraudulent returns or past criminal activity, may be maintained and used to make return authorization determinations. In some embodiments, one or more "positive files" may exist that list customers who may be accorded special treatment by the return authorization service. For example, one or more positive files may be maintained to list customers known to be profitable to the merchant and/or customers in the entertainment or fashion industries who may need to purchase and return merchandise on a frequent basis, or other categories of customers, who may be accorded special return privileges. Such positive and negative files may be used to make return authorization determinations, and, where appropriate, they may be used as part of a process for making coupon-related determinations, as well.

In some embodiments, agreements may be implemented allowing merchants to share their collected data for return authorization purposes.

Furthermore, the decision engine 135 and/or reward qualifier 153 may additionally or alternatively access and make use of information stored in data repositories that are external to the merchandise return and reward authorization service 100. External data sources may be used to access information such as, for example: customer and/or employee identification information, address information including postal box information, credit data, shoplifting data, crime data, identification theft data, sales tax data, online shopping data, such as from Internet retailers or other e-commerce data sources, or any of a wide variety of other useful information types. Such external data may be accessed externally on an as-needed basis and/or may be stored by the merchandise return and reward authorization service 100 for subsequent use.

In some embodiments, once the decision engine 135, in conjunction with the reward qualifier 153, has made an authorization determination for the requested return and an associated coupon determination, the merchant interface 130 may send a message to the point of return device 126, informing the clerk of the determinations. In some embodiments, the point of return device 126 may print a record of the requested return, indicating that the return has been accepted or denied. The POR device 120, or another device, may further print or otherwise make available a coupon, as will be described in greater detail with reference to FIGS. 5A and 5B.

For ease of description, the merchandise return and reward authorization service 100 as depicted thus far in the disclosure and with reference to FIG. 1 has been described as providing merchandise return authorizations, reward determinations, and other related services to a single merchant 120. However, it is to be understood that, in practice, it is much more common for the merchandise return and reward authorization service 100 to serve a plurality of merchants 120. When the merchandise return and reward authorization service 100 serves a plurality of merchants 120, it may maintain an associated plurality of data stores, including, but not limited to: the customer return data repository 140, the merchant data repository 145, the merchant return authorization policies 150, and the reward qualifier 153, for each of the merchants 120 for whom it provides return authorization and/or coupon-related services. The merchandise return and reward authorization service 100 may maintain these data stores separately, either logically and/or physically. Furthermore, the merchandise return and reward authorization service 100 may combine some or all of the various data stores described above.

Thus, although a wide variety of embodiments exist, for ease of description in this disclosure, it will be assumed that the embodiments of the merchandise return and reward authorization service 100 described herein maintain data received from different merchants 120 separately, and do not use data received from one merchant to make authorization return determinations or coupon determinations for another merchant. In other embodiments, however, modifications may be made to the systems and methods described herein such that the systems and methods may store data from a plurality of merchants together and/or may use data from one merchant in a return authorization and/or coupon determination request from another merchant. Furthermore, data from external third-party data providers, such as government information sources, credit bureaus, police information sources, and the like may be used by the merchandise return and reward authorization service 100 to make authorization and/or coupon determinations for the merchant 120.

The merchandise return and reward authorization service 100 and included modules 130, 135, 137, 140, 145, 150, 153, as depicted in FIG. 1, are one embodiment of a merchandise return and reward authorization service 100 in connection with the systems and methods described herein. It is to be understood that in other embodiments, the structures and functions of these modules may be implemented in a wide variety of different configurations without departing from the spirit of the systems and methods described herein. For example, some or all of the data storage functions, the decision-making functions, the communications functions, the authorization determination, the reward qualifier 153 and the like, may be provided by external third-party service providers, may be implemented at one or more merchant locations, including within the POR device 126, and/or may be implemented differently using different internal structures. Furthermore, although the merchandise return and reward authorization service 100 is depicted in FIG. 1 as being a single entity located at a single location, it is to be understood that in other embodiments, the structures and functions of the coupon/return authorization service 100 may be implemented in total or in part by a distributed system of hardware and software that may be located at two or more physically distinct locations.

Figure 2:
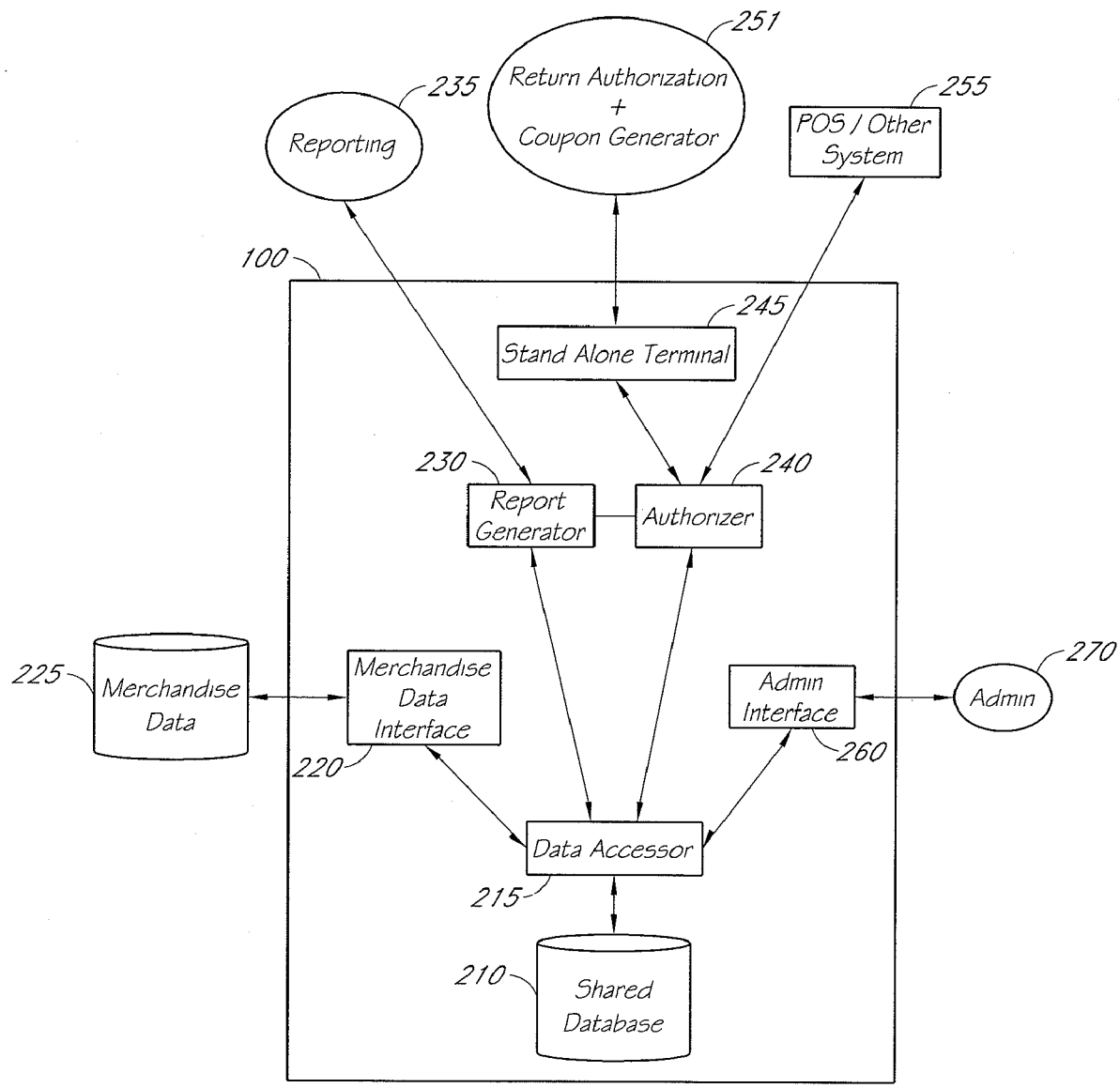
FIG. 2 is a block diagram depicting a closer view of one embodiment of a return authorization service.

FIG. 2 is a block diagram depicting a closer view of one embodiment of a merchandise return and reward authorization service 100 that provides a variety of services, including coupon qualification and generation, as well as return authorization, to the merchant 120. In FIG. 2, the various repositories of data used by the merchandise return and reward authorization service 100 for purposes of coupon qualification and/or return authorization, as described in part with reference to FIG. 1, are combined conceptually as a single shared database 210. As described with reference to FIG. 1, the data stored for use by the merchandise return and reward authorization service 100 may be stored and maintained as a single or a plurality of data repositories.

The data in the shared database 210 is managed by a data accessor 215 that receives data for storage in the shared database 210 from a variety of sources and that receives requests for data from the shared database 210 for a variety of purposes. In various embodiments, the data accessor 215 may manage the various types of data using any of a variety of computer-implemented platforms suitable for such purposes, including, but not limited to, DB2, Oracle, other SQL-based systems, or other database or file storage technology.

As depicted in FIG. 2, merchandise data 225 from a merchant 120 may be sent to a merchandise data interface 220 of the merchandise return and reward authorization service 100 for storage in the shared database 210 by the data accessor 215. For example, sales data, including very current sales data that may track real-time response to a given type of coupon, and/or real-time inventory levels may be included in the merchandise data 225.

Administrators 270 may use an administrative interface 260 of the return authorization service to send and receive data to the data accessor 215.

The data accessor 215 may further provide data to a report generator 230 that provides reporting services 235 to the merchant 120. For example, one or more reports about levels of coupon redemption, about choices made by customers with respect to coupon redemption, and the like, may be included in reports from the report generator 230. Reports for merchants may include daily transaction reports, as well as longer term reports for loss prevention analysis.

Reports may additionally or alternatively be made available to customers 110 who have received coupons, instant discounts, or other return-related rewards. The reports may include, for example, information about a dollar amount and/or a percentage saved by the customer 110 using one or more coupons, information about types of merchandise purchased with a coupon, information about a number or percentage of coupons received at a point of return that were actually redeemed by the customer, and/or information about a potential percentage or dollar amount saved if all return-related coupons had been redeemed by the customer.

An authorizer module 240, which may comprise, for example, reward qualifier 153 and/or the decision engine 135 that are described with reference to FIG. 1, provides coupon determinations 251 and return authorization. As depicted in the embodiment shown in FIG. 2, the authorizer 240 may communicate directly with a stand-alone terminal 245 that is dedicated for point of return use. The authorizer 240 is further configured to communicate with a point of sale or other system 255 used by the merchant to process merchandise returns, issue coupons, and to communicate with the merchandise return and reward authorization service 100.

In various embodiments, transfer of some or all of the data into and out from the merchandise return and reward authorization service 100 may be implemented, for example, using FTP transfer protocols. For protection of consumer privacy and merchant business information, the data is preferably transferred into and out from the merchandise return and reward authorization service 100 in an encrypted form, for example using PGP (Pretty Good Privacy) or other suitable encryption technology.

The functions and/or components of the merchandise return and reward authorization service 100 described with reference to FIG. 2 may be implemented, in some embodiments, as a plurality of servers operating as a server farm under the management of any of a variety of clustering technologies. Such an arrangement typically allows for relatively seamless replacement of components as well as upgrades and additions to the system as transaction volume increases.

Furthermore, the functions and/or various modules of the merchandise return and reward authorization service 100 may be implemented in various embodiments using personal computers (PCs), workstations, other processors, program logic, or other substrate configurations representing data and instructions, which operate as described herein. In various embodiments, the processors may comprise controller circuitry, processor circuitry, processors, general purpose single-chip or multi-chip microprocessors, digital signal processors, embedded microprocessors, microcontrollers and the like.

Figure 3:
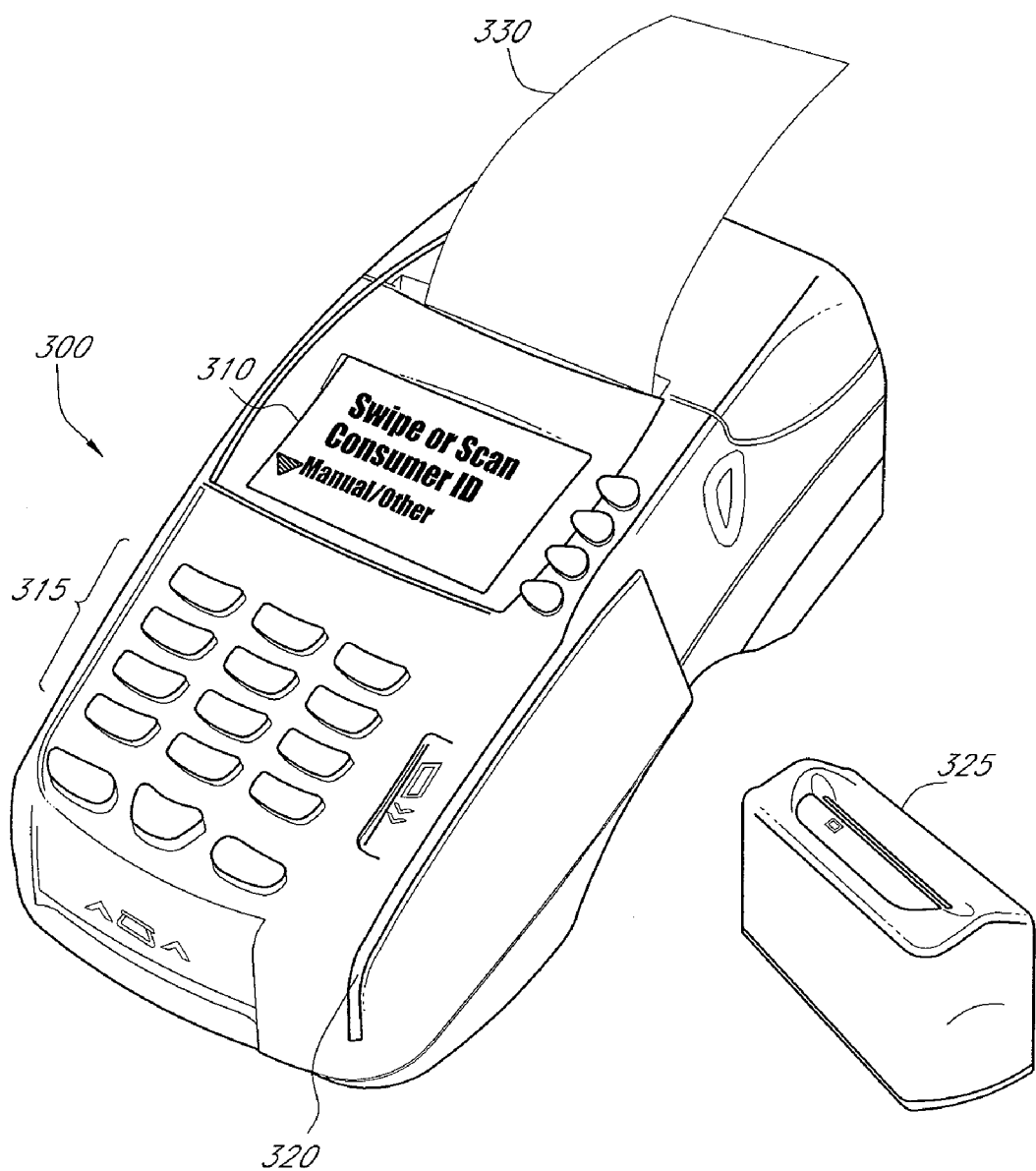
FIG. 3 depicts one embodiment of a dedicated point of return device.

FIG. 3 depicts one embodiment of a dedicated point of return (POR) device 300 for use in association with requested merchandise returns. The POR device 300 in FIG. 3 is configured to use a telephone dial-up connection or network cable connection to communicate with a reward authorization service such as the merchandise return and reward authorization service 100 described with reference to FIGS. 12 and 3. In other embodiments, one or more other wired or wireless communications systems are used for communicating. In some embodiments, some or all of the functions provided by the reward qualifier 153 may be provided by components that are internal to the POR device 300.

As depicted in FIG. 3, the POR device 300 includes a display screen 310 for communicating visually with a clerk or other person handling the requested return transaction.

Examples of communications that may be presented on the display screen 310 are described with reference to FIG. 4 to follow. In other embodiments, the POR device 300 may include audio speakers, video display, or any of a wide variety of other communications technologies for communicating information to the clerk.

The POR device 300 also includes a keyboard 315 with a plurality of buttons that allow the clerk to input information to the POR device 300. Additionally, other buttons and input systems in other parts of the POR device 300 also allow the clerk to input information to the POR device 300. In other embodiments, any of a wide variety of other input systems, such as voice recognition systems, keyboards, touch screen systems, camera or video systems, biometric systems, and the like, may be used additionally or alternatively for allowing the clerk to input information into the POR device 300. Furthermore, other forms of electronic reading devices, including, but not limited to, 1-dimensional, 2-dimensional, or 3-dimensional barcode scanners, magnetic stripe readers, readers for other electronically-readable codes, RFID readers, any of a wide variety of biometric data input devices, and the like, may be used to input data to the POR device 300. For example, the POR device 300 depicted in FIG. 3 includes a built-in magnetic stripe reader 320 for scanning identification cards, credit cards, and the like that include a magnetic stripe, and a peripheral 2-dimensional bar code scanner 325 for reading cards provided with a 2-dimensional barcode. Other peripherals for inputting data about a wide variety of other identification and informational sources may also be used.

Various types of data about the requested return merchandise may be collected for a return transaction, including, for example, amount, type, and value of items being presented for return. In some embodiments, product identifiers, such as a Stock Keeping Unit code (SKU), Universal Product Code (UPC), Radio Frequency Identifier (RFID), and the like, may be used to identify the merchandise and may be further used to access stored information about the merchandise. Other data about the current return transaction, and about one or more original purchase transactions associated with the merchandise to be returned, such as receipt identifier, date and time, and store number and location, transaction identifier, cashier identifier, register number, and the like may also be collected by the POR device 300.

As shown in FIG. 3, the POR device 300 may be configured to produce a paper receipt 330 or other record of the merchandise return transaction for the customer 110 and/or for the clerk on behalf of the merchant 120. In other embodiments, a record of the transaction may be provided to the customer 110 using email or other electronic communications technology. Where the customer 110 is requested to sign a record of the return transaction, the POR device 300 may include a system for electronically capturing the signature or other form of customer acknowledgement. In some embodiments, a coupon that is provided to the customer 110 at the point of return 125 is printed, or otherwise displayed, on the receipt 330. In other embodiments, the POR device 300 prints a coupon that is not associated with a receipt. Furthermore, in some embodiments, a coupon is provided to the customer by electronically crediting a loyalty account, credit card account, or other digital account associated with the customer as an alternative or an addition to issuing the customer a physical coupon. In some embodiments, the POR device 300 communicates with a peripheral printer or other external device for providing the coupon to the customer.

As described above, the functions of the POR device 300 may additionally or alternatively be provided by other types of electronic devices, such as a suitably programmed and configured point of sale (POS) terminal, cash register terminal, or other device that may process merchandise returns as well as other types of transactions and that may use technologies such as biometrics, bar-code readers, any of a variety of printing or other coupon-generation technologies, and the like.

Figure 4:
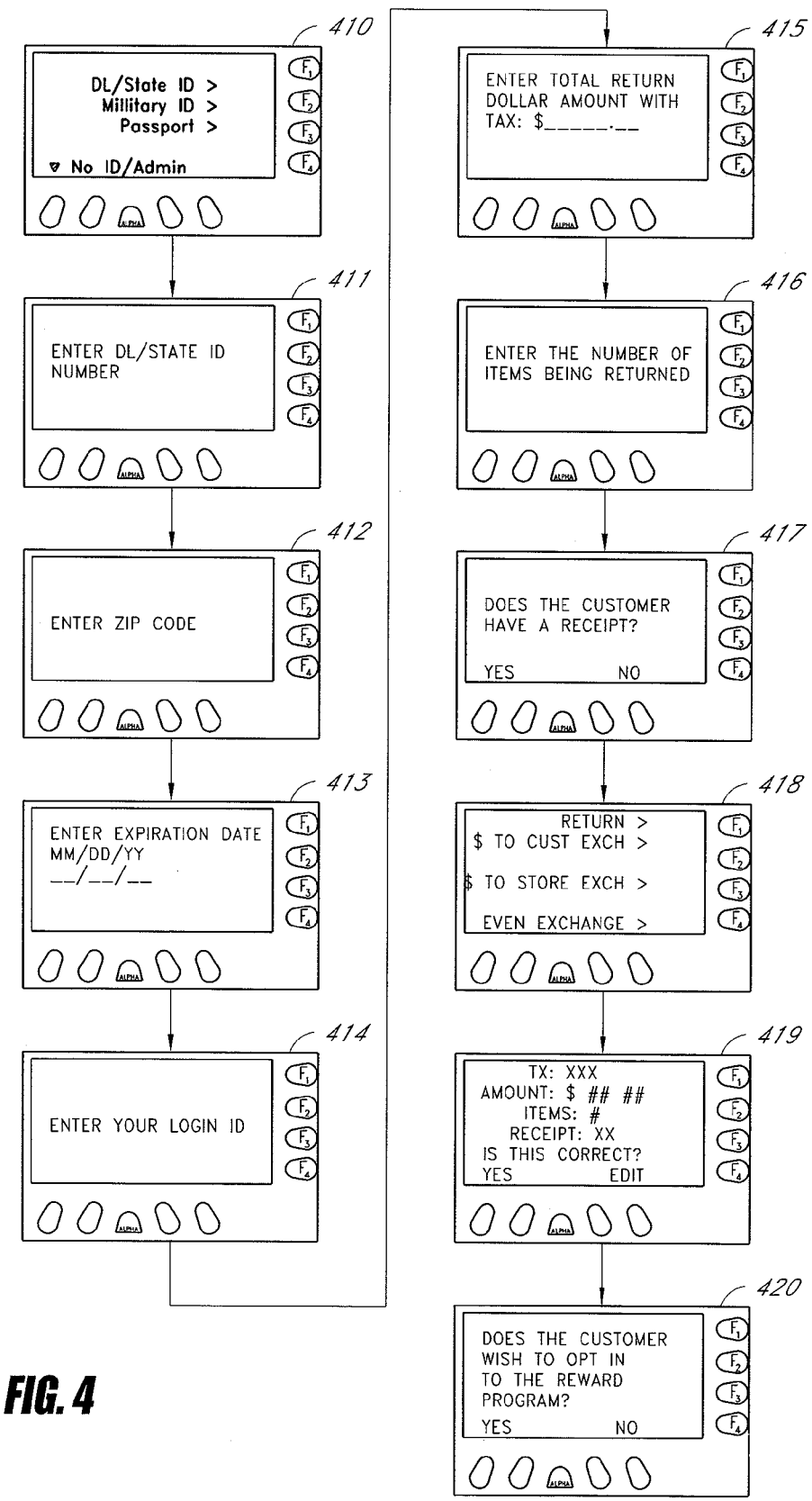
FIG. 4 depicts a series of user interface screenshots for one embodiment of a process for collecting data at a point of return.

FIG. 4 depicts a series of sample user interface screenshots 410-419 for one embodiment of a process for collecting data at a point of return 125. The screenshots 410-419 depicted in FIG. 4 exemplify screenshots that may be presented on a display screen 310 of a POR device 300 such as the one depicted in FIG. 3.

The screen shots 410-419 represent prompts to the clerk to input information associated with the requested merchandise return so that a coupon determination may be made for a requested return. In the sample screenshots shown in FIG. 4, the first four screenshots 410-413 represent prompts for information about the customer 110 requesting to make the return. Screenshot 414 represents a prompt for the clerk to enter identifying information about him/herself. Screenshots 415-418 represent prompts for the clerk to input information about the requested merchandise return transaction, if any, and Screenshot 419 represents a prompt for the clerk to verify, and, if need be, edit, the information previously input to the POR device 300 before the information is sent to the reward authorization service 100 with a request for a coupon decision. Screenshot 420, which may optionally be included in some embodiments, prompts the clerk to offer the customer an opportunity to "opt in" to a reward program, as will be described in greater detail below.

Describing the screenshots more specifically, in Screenshot 410, the clerk is prompted to indicate which kind (if any) of identification verification the customer 110 is providing. In Screenshot 411, assuming that the clerk indicates that the customer 110 is presenting a driver's license or other state identification card, the clerk is now prompted to input the driver's license number or state identification card number. As was discussed above, this information may be keyed in, read electronically from a magnetic stripe, barcode, or other smart card reader, or input using any of a wide variety of other input technologies.

Furthermore, in various embodiments, if desired, the POR device 126 may be configured to alternatively or additionally accept input about other types of identification, such as other types of U.S. government-issued identification numbers, or Canadian or Mexican identification numbers. Examples of identification that may be used, alone or in combination with one another, include, but are not limited to numbers, identifiers or other data associated with: student identification, military identification, passport, voter registration card, Immigration and Naturalization Service documents (such as a green card or laser visa), consular identifications (matricula consular and others), loyalty card, gift card, coupon, merchandise credit slip, receipt authorization code, checking account, receipt date or other combination of receipt data identifiers, name, address (current and/or past), data of birth, phone number, SSN, credit card, debit card, biometrics (photo, face, fingerprint, voice, DNA, retinal), employer identification number, digital image of the customer obtained from license, customer birth date and/or age, driver's license expiration date, security system number, and many other types of accounts and identifiers.

In Screenshot 412, the clerk is prompted to input the customer's zip code, which may be used, for example, to assist in verifying correct identification of the customer 110, as well as to provide information about the distance from merchant establishment to the customer's home, which may be used in some embodiments of the coupon determination. In Screenshot 413, the clerk is prompted to input the expiration date of the customer's driver's license or state identification card. In Screenshot 414, the clerk is prompted to enter a login ID or other employee identification number. In Screenshot 415, the clerk is prompted to enter the total dollar return amount requested by the customer 110. In Screenshot 416, the clerk is prompted to enter the total number of items being presented for return by the customer 110. In Screenshot 417, the clerk is prompted to enter whether the customer 110 has a receipt for the items being returned.

In Screenshot 418, the clerk is prompted to enter the type of return being requested by the customer 110. For example, the customer may be requesting to return the merchandise for a cash exchange (or credit to an account on which it was originally charged), for an even exchange with merchandise priced exactly the same, or for a merchandise exchange when a new merchandise purchase is presented to the clerk as part of the return transaction and for which a dollar balance is due to either the customer or to the store. In other embodiments, the customer may request and/or be offered an opportunity to exchange all or a portion of the merchandise for a gift card, store check, store credit, debit card, credit card, or other suitable tender or medium of exchange, and the POR device 126 may be configured appropriately to capture that information.

In Screenshot 419, the clerk is presented with a summary of the inputted transaction information. The return transaction is assigned an identification number, and the clerk is prompted to verify that the exchange dollar amount and number of items have been correctly entered. The clerk is also prompted to verify whether a purchase receipt has been provided with the return request. The clerk provides an input indicating either that the information is correct or that the information needs to be edited.

In some embodiments, in Screenshot 420, the clerk is prompted to inquire if the customer would like to be considered for receiving a coupon. In some embodiments, a determination of whether to offer a coupon to a customer is only carried out if the customer has expressed an interest in receiving a coupon. Furthermore, in some embodiments, customer return data is only used for determining whether to offer a coupon, and, if so, which coupon to offer, if the customer has expressed an interest in receiving a coupon, which may be considered to be "opting-in" to a merchant reward program. In other embodiments, customers may be assumed to be interested in being offered a coupon and, thus, no "opting-in" question is asked of the customer.

In some embodiments, customers who have "opted-in" may have an opportunity to express preferences with regard to coupons. For example, the clerk may ask the customer coupon-related questions, or may offer the customer a preference form to fill out, or use a touch screen to indicate preferences, or the customer may be emailed or mailed or reached by telephone to provide coupon preference information that the merchant may use in making this and/or future coupon-related determinations.

In some embodiments, the "opting-in" prompt of Screenshot 420 is presented before the summarizing Screenshot 419, which is amended slightly to include a reference to the customer's "opt-in" decision, so that the clerk may verify and, if need be edit, the opt-in decision in addition to the other return-transaction related information input into the POR device 300.

The screenshots of FIG. 4 have been provided as an example of a POR device 126 user interface interaction for inputting information about a requested merchandise return. As will be familiar to one of skill in the art, a wide array of variations may exist in the exact methods used to obtain information about the requested return at the point of return 125. In some embodiments that are configured to offer instant discounts, pre-return coupons, or other incentives for the customer not to make the return transaction, the screenshot prompts may direct the clerk to offer one or more incentives to the customer and to input information about the customer's acceptance of the incentive. In some embodiments, information about the requested return, the incentive offer, and the customer's response to the offer may be transmitted to the merchandise return and reward authorization service 100 for storage for future reference.

Thus, in various embodiments, the content and order of screenshot prompts may be different than those depicted in FIG. 4, and, in fact, the clerk may be expected to input the relevant data in response to an interactive voice response (IVR) system or without the use of prompts at all. In some embodiments, the POR device 126 may be configured to allow for the collection of some or all of the following additional information: retailer identification, consumer name and address, current price of the returned items, identifier (such as SKU number, UPC, or other type of identifier) of the returned items, product condition, customer's stated reason for making the return, purchase date, time, tender type, and original salesperson, original sales transaction identifier, as well as other types of information, such as the customer's stated preferences regarding coupon offers.

Furthermore, the POR device 126 may preferably be configured to automatically transmit some additional information to the reward authorization service 100 with the request for coupon decision. For example, an identifier associated with the POR device 126 may be transmitted to the reward authorization service 100 and may be used to identify the merchant 120, the store branch or other location at which the point of return device 126 is located, as well as the date and local time of the requested return transaction, and the like.

As will be described with reference to FIG. 6, in various embodiments, the determination whether to provide a coupon to the customer at the point of return 125, or otherwise in association with a requested return transaction, may depend on a wide variety of factors, some of which may involve the input of data at the point of return 125. Accordingly, the series of prompts that are displayed to the clerk may be adjusted to prompt for data appropriate to the given embodiment.

Figure 5A:
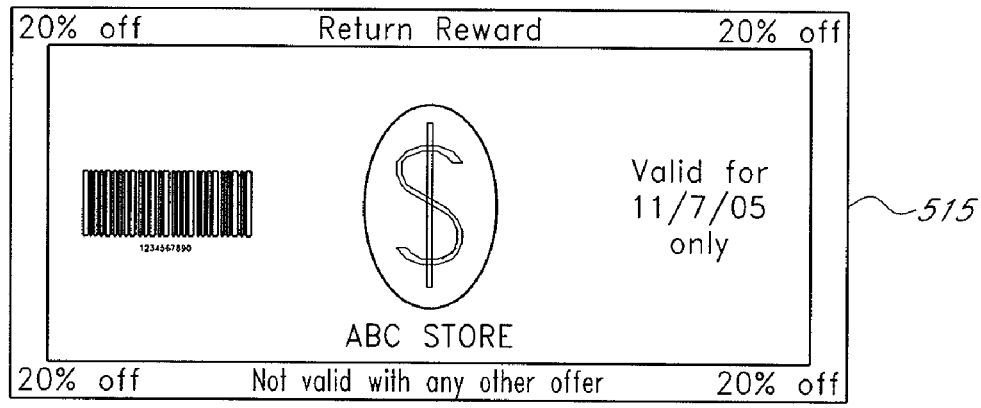
Figure 5A:
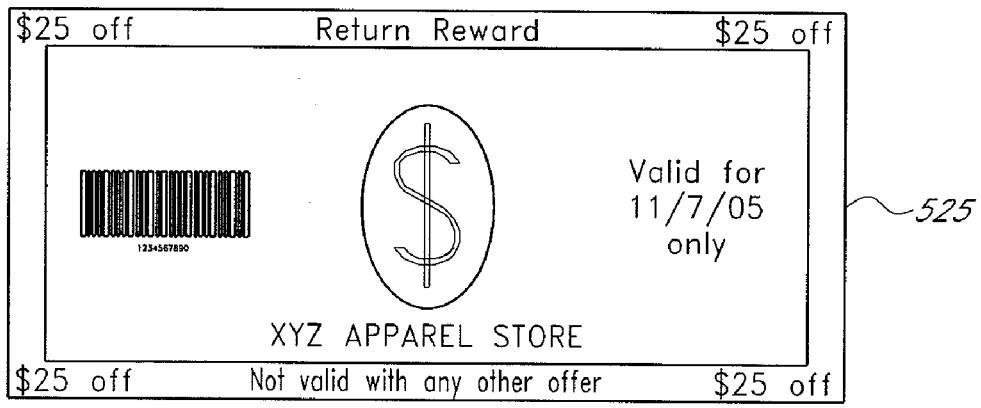
Figure 5B:
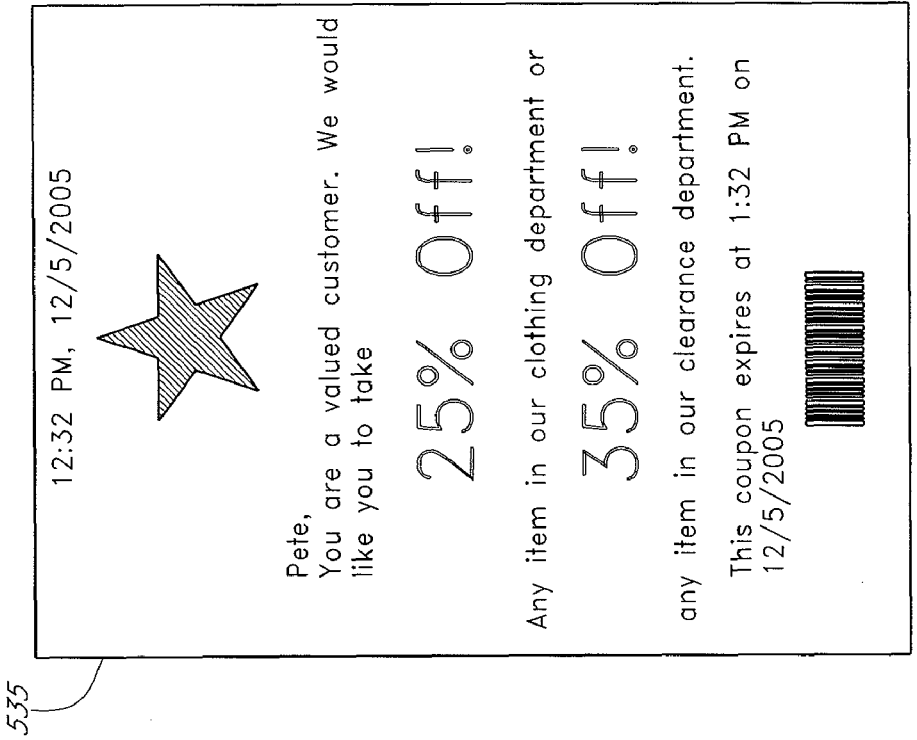
Figure 5B:
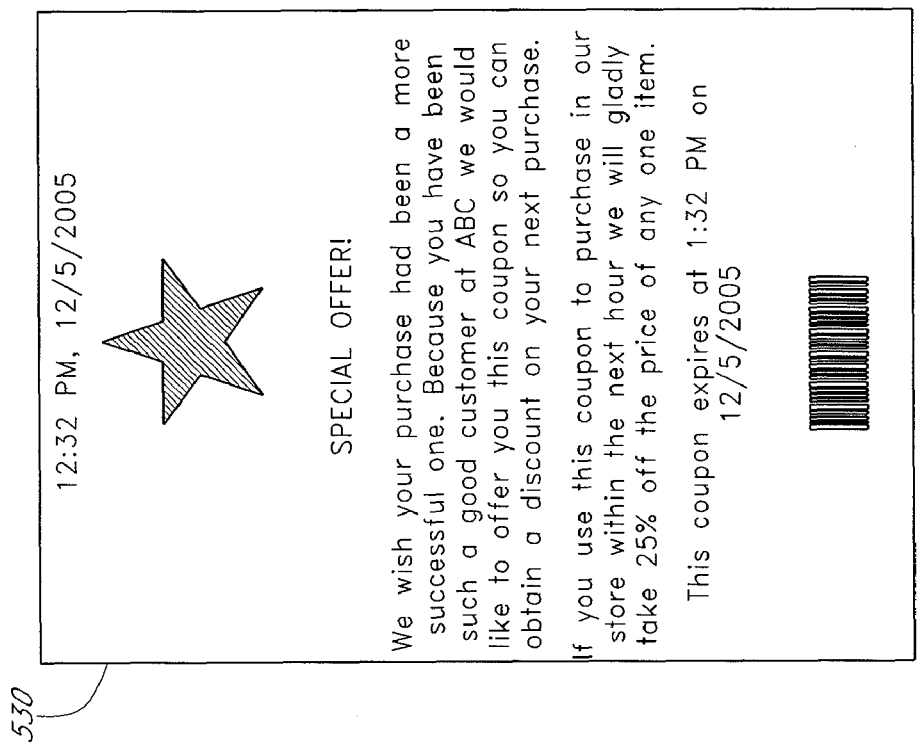
Figure 5C:
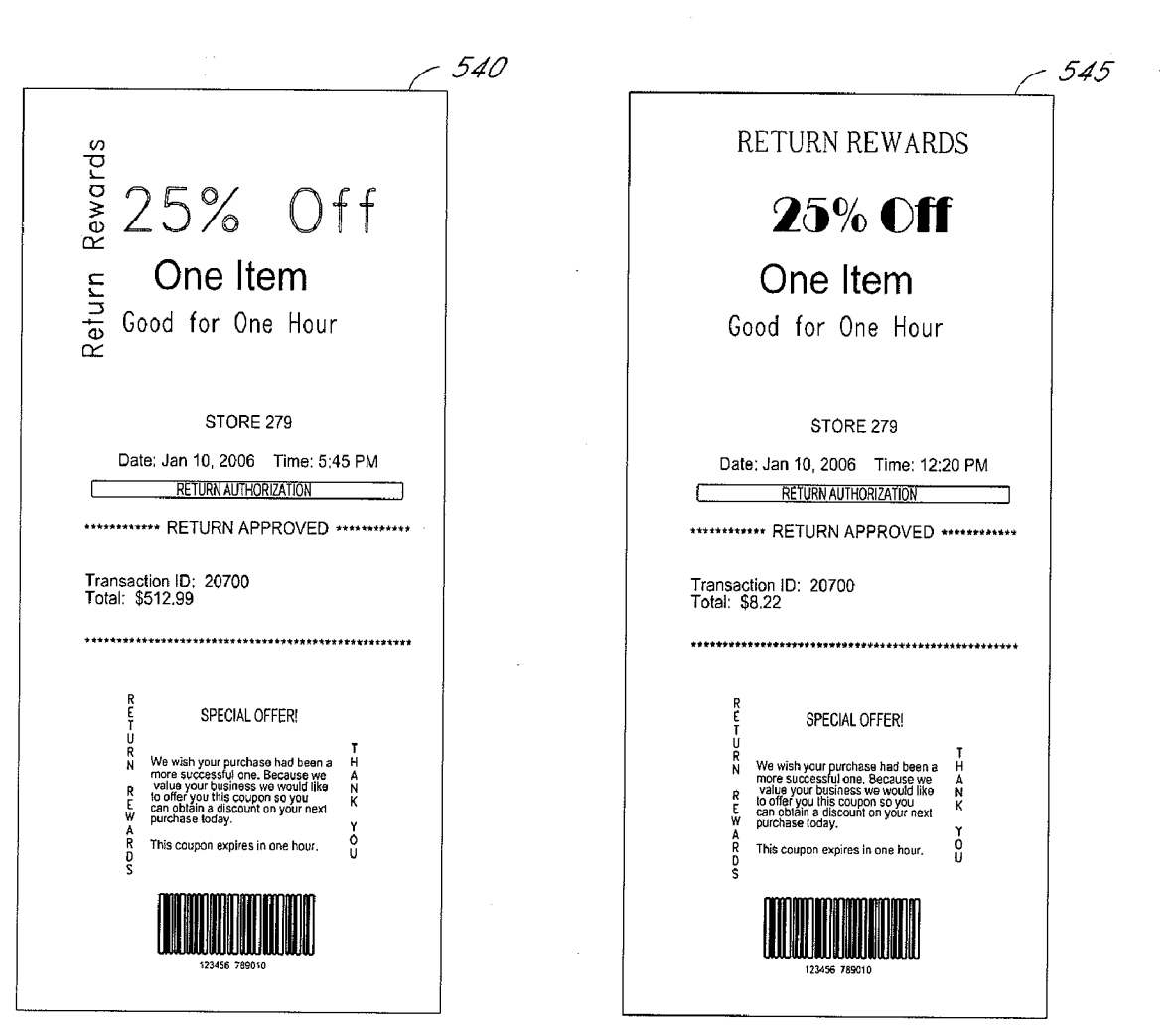

FIGS. 5A-5C depict embodiments of coupons 515, 525, 530, 535, 540, 545 that may be issued at a point of return 125. Coupons 515 and 525 depicted in FIG. 5A are embodiments of coupons that may be printed in association with a requested return transaction by a dedicated POR device 300, such as the one depicted in FIG. 3, or by another type of device capable of printing. As depicted in FIG. 5A, the coupons 515, 525 include an indication of an offered discount, a name of the store at which the coupon 515 is valid, and a date or time frame for which the coupon 515 is valid, which in some preferred embodiments, is the date on which the return transaction is requested. Coupon 525 expresses the discount in terms of a dollar amount discount, while coupon 515 expresses the discount as a percentage off a purchase price. In some embodiments, the coupon 515 may specify whether the percentage discount applies to a single purchased item, to a single set of items purchased together, or to some or all of the customer's remaining purchases at the store on the date or time frame listed on the coupon 515. The coupons 515, 525 may also include a scannable bar code or other identifier that allow the merchant 120 and/or the merchandise return and reward authorization service 100 to track redemption and use of the coupons 515, 525. For example, in some embodiments, a scannable bar code or other identifier may allow the merchant to track whether the coupon is being redeemed by the customer to whom it was issued, or by another customer. The coupons 515, 525 may also include text stating that they are not valid with other offers, other coupons, other promotions, and the like.

In other embodiments, the coupons 515, 525, may have no printed date and/or no printed discount amount and/or other missing data, and may instead leave room for the clerk to manually enter a date of validity, a discount amount, and/or other missing data. In such embodiments, a plurality of the coupons may be pre-printed and available at the point of return 125 for use in conjunction with a plurality of return transactions. Furthermore, in such embodiments, the POR device 126 may receive information from the return authorization service and/or coupon issuing service 100 instructing the clerk regarding how to fill in the data missing from the coupon. In some embodiments, the clerk may be authorized to set the terms of the coupon issued by the automated system or to override and reset some or all of the coupon terms. In various embodiments, the coupon may be provided with a scratch-off portion, either pre-printed or printed for the customer, that allows the customer to scratch off a coating to reveal a coupon value or the like.

In FIG. 5B, coupon 530 and coupon 535 depict embodiments of coupons that include additional features that may be incorporated in conjunction with the systems and methods disclosed herein. For example, both coupons 530, 535 include, at the top of the coupons, a time and a date of coupon issuance. Furthermore, both coupons 530, 535 include, at the bottom of the coupons, a time and a date of coupon expiration. Coupons 530 and 535 illustrate the use of a coupon with a very limited duration of validity, which in this case is one hour in length, in order to encourage the customer to use the coupon before leaving the merchant's store. In some embodiments, the expiration time and/or date may be variable, and may be dependent on other terms of the coupon. Coupon 530 further includes text that acknowledges, directly or indirectly, that a return transaction has taken place, or has at least been requested. Coupon 535 is personalized to include the customer's name. Coupon 535 also includes a choice of discount offers, from which the customer may select as desired. In some embodiments, the coupon may additionally or alternatively include the customer's birth date, address, email address, and/or telephone number. As was the case with the coupons of FIG. 5A, the coupons 530, 535 depicted in FIG. 5B include a bar code that allows information about redemption of the coupon to be captured at a point of sale and tracked.

FIG. 5C depicts two additional embodiments of coupons 540, 545 that may be issued at a point of return 125 in conjunction with a return authorization. In coupons 540 and 545, an indication is included stating that the customer's requested return has been accepted, along with a transaction identification number and return transaction identifier and a return transaction dollar total amount. An identifier of the merchant location at which the return has been requested is also included. Furthermore, in the sample coupons 540, 545 depicted in FIG. 5C, the time frame for the coupon is explicitly described in words as lasting for "one hour," which may draw the attention of some customers to duration of coupon validity more than would a time frame defined by an ending time alone.

In various other embodiments, other types of coupons, with different features, as well as with some, all, or none of the above-described features, may be provided to customers. For example, in some embodiments, a discount may be offered at an affiliated or non-affiliated store as an alternative or in addition to offering the discount at the merchant's establishment 120. For example, a clothing retailer at a mall may issue a coupon for a restaurant at the same mall. Furthermore, in some embodiments, a coupon may be issued that is valid for a future date, rather than for immediate use, such as a coupon for use at a special sale event, a "Best Customers" day, a "Members Only" sale date or other occasion in which the merchant wishes to encourage the customer to participate.

In some embodiments, the discount amount may vary depending on a date and/or time of redemption and/or a location of redemption. For example, the coupon may offer a 35% discount if used within thirty minutes or a 20% discount if used within one hour, and 15% if used within the same week. Similarly, the coupon may offer a 25% discount at the merchant's store 120 and a 35% discount if used at another designated store before the time/date of expiration. In some embodiments, a coupon might be issued, or its terms changed, based at least in part on the date and personalized information about the customer. For example, if the date of the requested return transaction coincides or is close to the customer's birthday, anniversary, or other personal day of significance, terms of the coupon may be adjusted accordingly.

In various embodiments, any of a wide variety of security features may be implemented with respect to the coupons in order to discourage fraudulent behavior, such as unauthorized copying or altering of coupons. For example, the use of checksums, invisible signatures or codes, unique paper signatures, such as those created using radio emitters or other technologies, as well as print-based methods, such as the use of random color, or invisible ink that can only be seen when swiped with a special pen, may be employed to reduce the risk of coupon-related fraudulent behavior.

Furthermore, in various embodiments, the coupons may present any of a variety of special effects for the customers. For example, coupons printed on specially prepared thermal paper may use ink that is invisible until it is heated as it goes through a printer and that may be used to provide a colored border or other graphic design on the coupon. In some embodiments, coupons may be printed on thermal paper that has a perfume or other fragrant material whose scent is released when the paper is heated during printing.

The embodiments of coupons 515, 525, 530, 535, 540, 545 depicted in FIGS. 5A-5C may be printed for presentation to the customer. Other embodiments of coupons may additionally or alternatively be emailed to the customer, may be electronically added to a loyalty card, smart card, store card, debit card, stored value card, RFID-enabled device, transponder, or other medium for data storage or may be "credited" to the customer's store credit or other account.

Figure 6:
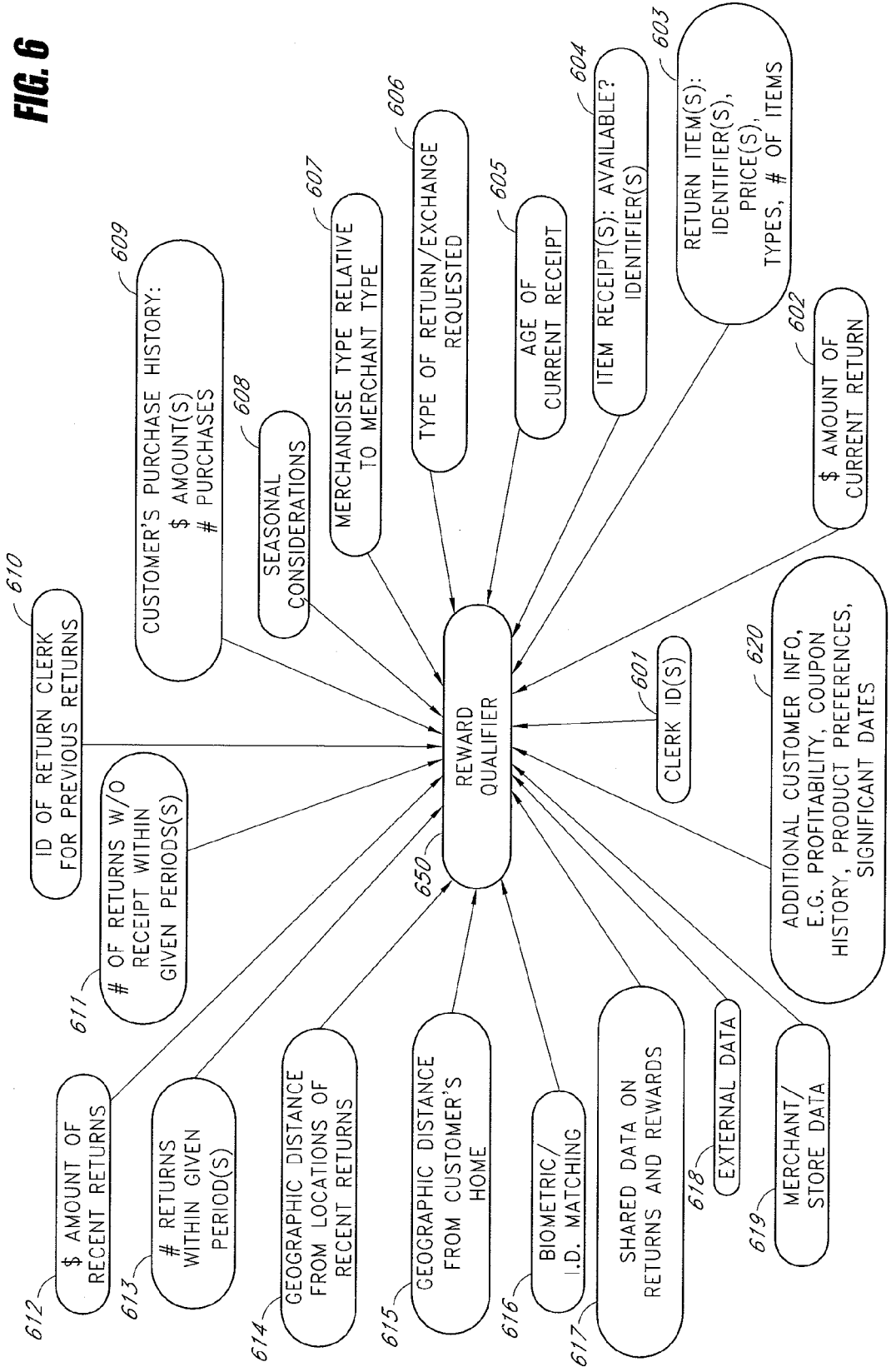
FIG. 6 depicts a set of factors that may be used to influence one embodiment of an authorization process and/or a process for determining whether to provide a reward at a point of return.

FIG. 6 depicts a set of factors 601-620 that influence one embodiment of a process for determining whether to issue a coupon at a point of return 125 and, if so, what terms to include on the coupon. In other embodiments, a different set of factors, including some, all, or none of the factors depicted in FIG. 6, may influence the reward-related determination 650. Furthermore, some or all of the factors may influence a determination as to whether to authorize the requested merchandise return transaction.

Broadly speaking, the factors may include information about the current return, information about the customer's identification, information about the customer's past purchase and/or return history, as well as general information about the store and other related data. Some of the factors may be used to assess a measure of likelihood that the current requested return represents fraudulent and/or abusive behavior on the part of the customer with respect to merchandise returns, coupons, or a combination of the two. Some factors may be used more directly to determine whether to offer a coupon and, if so, to determine terms to be included on an offered coupon.

For example, factors 601-607 associated with the current return transaction may include information about an identifier 601 for the clerk handling the return, and in some embodiments an identifier for the clerk(s) who handled the associated purchase transaction, a dollar amount associated with the requested return 602, the items in the current return 603, a receipt for the items being returned 604, the age of the receipt 605, the type of return 606 requested by the customer, and the type of merchandise being returned relative to the merchant type 607. Other factors associated with the current return transaction may include, but not be limited to, a location and/or identifier for the merchant, the day, date and/or time of the requested return, an amount of time lapsed since purchase of the items being returned, and information about other customers in the merchant location 120 during the time of the requested return transaction.

The dollar amount associated with the return 602 may include a net return dollar amount, for example, the dollar amount of the requested return without tax, or the net amount of the return with any discounts taken into consideration. The dollar amount 602 may additionally or alternatively include a net transaction amount that takes into consideration the amount of the return amount and the amount of any purchases and/or exchanges being made by the customer at the same time.

Information about items presented for return 603 may include information about one or more item identifiers (bar code, UPC, SKU, RFID, and the like), information about individual item prices and merchandise types, as well as a total number of items being returned. In some embodiments, for example, when a given type of item is returned, a recommendation to provide a coupon for a similar type off item may be sent to the clerk at the point of return 125.

Information about one or more purchase receipts 604 for the items being presented for return 604 may include, for example, date of the receipt, one or more data items that serve to identify the receipt, and whether a receipt is presented by the customer for each returned item.

Factors associated with the customer's identification may include a matching of the identification and/or biometric information 616 offered by the customer at the point of return 125 with stored identification and/or biometric information about the customer 110. For example, information about fingerprint, retina, voice and/or facial or other metrics may be used. Additionally, information about the customer's current and, possibly, past home addresses may be used to calculate the geographical distance 615 from the customer's home to the store. The customer's home address may also be compared to stored information about the clerk's home address in order to rule out a possibly fraudulent and usually forbidden processing of the return transaction by clerk who shares a home address with the customer 110. Additional information about the customer, such as, for example, birth date, state of residence, state of identification card, identification number, loyalty card number, gift card number, checking account number, coupon number, merchandise credit slip number, phone number(s), credit card number, check number, debit card number, receipt authorization code, license expiration date, and any information available on a driver's license or other presented form of identification may also be used in as factors.

In some embodiments, identification of the customer allows for determining whether the customer is included on a "positive list" of customers whose returns may be automatically accepted or authorized more easily, or a "negative list" of customers whose returns may be automatically rejected or scrutinized more carefully, or another subset of customers whose merchandise returns may be processed in a special manner. Furthermore, one or more coupon-related "positive" and/or "negative" lists may be used in making a reward-related determination 650.

Furthermore, other available types of information about the customer, such as credit information, check information address history, and possible shoplifting record or other criminal record information may also be useful as a factor.

A wide variety of factors regarding the customer's history of purchase and/or return transactions may influence the reward-related determination 650. For example, two factors are the number of returns 613 and the dollar amount of the returns 612, as well as the dollar amounts and identifiers of the individual merchandise items, that the customer has requested within one or more recent periods of interest, including, in some embodiments, the occurrence of any denied return transactions. Dates, times, and locations of previous requested returns may be a factor, as well as previous return authorization scores or other assessments determined for the customer and past returns for the same items as the current return. Another factor is the number of unreceipted returns 611 that the customer has requested within one or more recent periods of interest. The identifiers for the clerks handling previous returns 610, their coupon-related decisions (such as coupon overrides, changes to terms, and the like) and the geographic distances from the locations of other recent returns 614, as well as the number of returns within a predetermined geographic area, may be used as factors in the determination whether to issue a coupon and/or determine terms of the coupon.

In addition, in some embodiments, information about the customer's purchase history 609 with the merchant, including, for example, dollar amounts, numbers of items, price and identifiers of individual items, and number of recent purchases, payment types and payment history, previous coupons received, previous coupons used, previous authorization scores, and profitability 620 of the individual customer may influence the determination 650. Additional factors of interest associated with the customer's past transactions may include information about discounts and/or credit associated with previous purchases and/or overrides associated with past returns, as well as past payment information. Furthermore, additional personal information 620 about the customer, including, for example's product preferences, birth date and/or other significant personal dates, information about the redemption of previously issued coupons, and/or about returns of merchandise purchased with coupons may be factors in the determination 650. In some embodiments, information about the customer from the retailer's loyalty program may be used.

In addition to the above-described factors, other factors may influence a reward-related determination 650, as suits the preferences of the merchant 120. As one example, the merchant 120 may desire to have seasonal considerations 608 influence the authorization determination 650, for example, providing more coupons and/or coupons with more generous terms during the holiday shopping season, or alternatively, allowing more returns while providing fewer coupons. Seasonal considerations 608 may also affect subsequent determinations 650, such as in embodiments in which returns made during a holiday period are considered more likely to be returns of gifts and therefore more indicative of a customer's first time in the store. One or more appropriate coupons may be generated based at least in part on this assumption.

Other types of information available from external sources 618, either publicly available free information and/or purchased information may serve as factors. For example, sales tax information, postal box information, census data, householding data, identification theft data, Department of Commerce data, credit data, bank data, check data, crime data, loan delinquency data, and the like may be received from sources external to the merchandise return and reward authorization service 100 and used to make a determination 650. Some or all such data 618 may be stored for later use and/or may be accessed from one or more external sources on an as-needed basis.

Data collected and/or maintained by the merchant 619 may include a wide variety of information. For example, information may be accessed from the merchant's and other merchants' inventory management, catalogs, and merchandise sales tracking systems. Information about the merchant's inventory, merchandise mix, mix of sales by SKU identifier, mix of inventory by SKU identifier, store sales performance, store profitability, average sale amount for the store, average return amount for the store, current coupon promotions, current sales promotions, store location, and local demographics may be used in a rewards qualifier determination 650. In addition, information from customer loyalty, discount, incentive, rewards and/or reward programs, including web-based coupons, web-based marketing information, web-based consumer activity-tracking information, and the like may be used in making a reward-related determination 640. In some embodiments, the merchant may store coupon preference information for customers, especially when customers may register to be included in a reward program and may indicate their preferences.

Furthermore, data that has been collected by other merchants 617, including data collected in association with purchase and/or return transactions and authorizations, as well as return-related reward programs or other coupon-related activity, including instant discounts accepted, returns of merchandise purchased with coupons, and the like, may be shared with the merchant 120 and used as factors in the determination 650.

As stated above, some or all of the factors 601-620 in FIG. 6 may influence one embodiment of a process for determining whether to issue a coupon, and what type of coupon to issue, at a point of return 125. In other embodiments, a different set of factors, including some, all, or none of the factors depicted in FIG. 6, may influence the determination 650. Broadly speaking, the factors may include information about the current return, information about the customer's identification, information about the customer's past purchase and/or return history, as well as general information about the store and other related data.

With respect to the process for determining when to authorize a return and the process for determining whether to provide a coupon to the customer, any one of the factors described herein with reference to FIG. 6 or in any other portion of this disclosure may be used by the decision engine 135 and/or reward qualifier 153 as a single or separate factor, or may be used in combination with any subset of the factors 601-620 to make a determination 650. For example, in some embodiments, customer identification information 616 may be used in conjunction with any one or more of the following types of information to make a determination: original receipt date, dollar amount of the return without tax, net return transaction amount, number of items being returned, SKU identifier(s) for returned item(s), RFID identifier(s) for returned item(s), and receipt identifier or combination of uniquely identifying data items for the receipt. In other embodiments, other single factors or combinations of factors may be used to make the determination 650.

Thus, the processes for determining when to authorize a return, whether to provide a coupon, and what coupon terms to offer may be highly customized to the business preferences of the merchant 120, if desired, and may be tailored to include factors deemed relevant and practical for the merchant's business.

Figure 7:
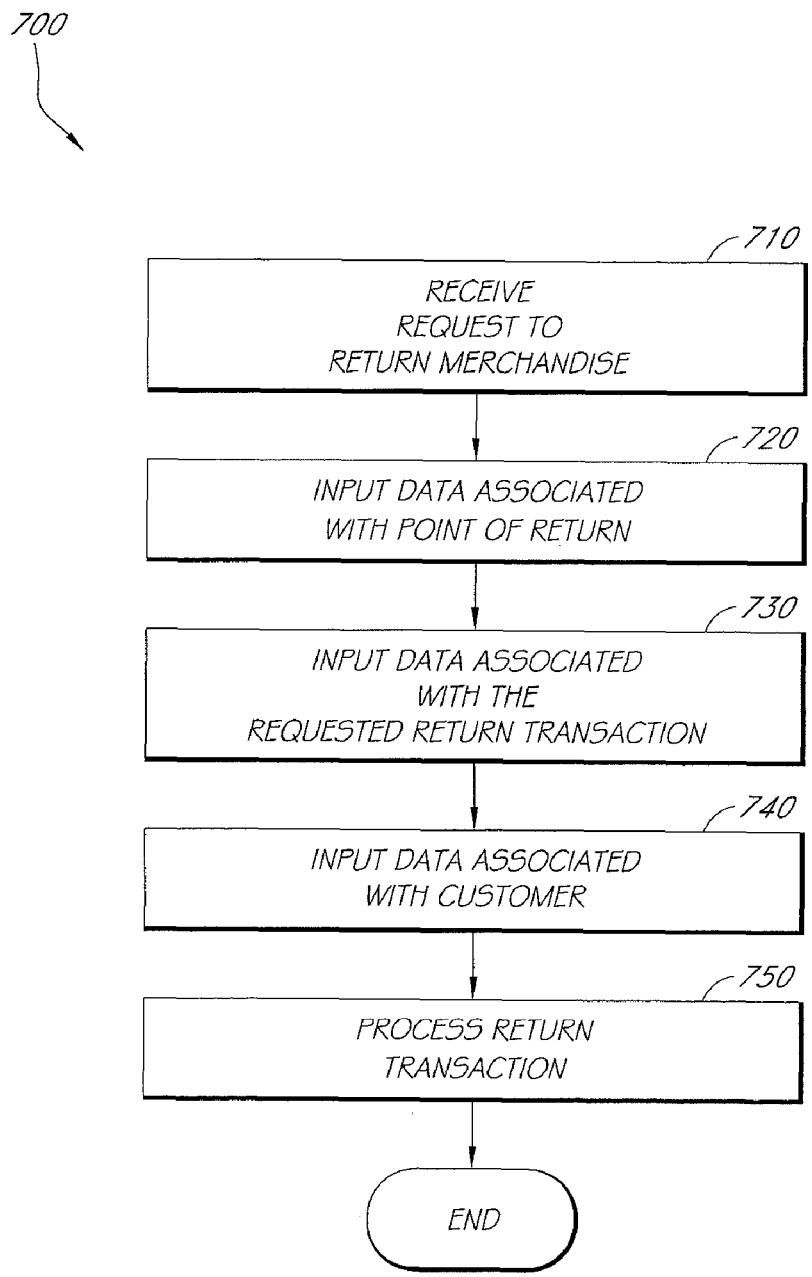
FIG. 7 is a flowchart that illustrates one embodiment of a process for collecting data at a point of return.

FIG. 7 is a flowchart that illustrates one embodiment of a process 700 for collecting data at a point of return 125 in connection with an automated and selective offering of a coupon to a customer at a point of return 125. Specifics about types of data collected may depend, at least in part, on whether the coupon system is implemented in conjunction with a return authorization system, as well as on a level of analysis performed by the coupon-related data collection process 700. Thus, the embodiment depicted in FIG. 7 is provided as an illustration and not to limit the scope of the coupon-related data collection process 700.

The process 700 begins in Block 710 with the receipt of a request to accept a merchandise return. Moving on to Block 720, in one embodiment, a clerk at the point of return 125 inputs data associated with the point of return 125. For example, the clerk may be prompted, or may input without being prompted, an employee identifier that allows himself or herself to be identified as handling the requested return. In other embodiments, the clerk may also input a POR device 126 terminal number, and store location for use in the return authorization determination. Information about the POR device 126 terminal number and/or store location may additionally or alternatively be provided automatically by the POR device 126 and/or may be accessed from stored information associated with the POR device 126.

In Block 730, the clerk inputs data associated with the requested merchandise return transaction. The inputted information may include, but is not limited to, any of the following types of information: date and/or time of the requested return transaction; quantity, identifiers, prices, and/or types of the merchandise items being presented for return; presence or absence of receipt(s) for the merchandise being presented for return; and a type of return being requested (for example, exchange for merchandise, exchange for cash or other form of tender, partial exchange, etc.)

In Block 740, the clerk inputs data associated with the customer. For example, any of a wide variety of types of identification information about the customer may be inputted. In addition, information about the customer's interest in receiving a coupon (opting-in) and/or the customer's coupon preferences may be inputted.

As will be familiar to one of skill in the art, the above-mentioned types of information may be inputted using a wide variety of data-input method technologies associated with the POR device 126 and/or any of a variety of peripheral or associated devices. For example, the data may be input using one or more of: a keyboard, touch screen, stylus, microphone, camera, magnetic stripe scanner, bar code scanner, other electronic reader, biometric input device, or other appropriately configured devices.

In Block 750, the coupon determination associated with the requested merchandise return transaction is processed, either together with an authorization determination for the requested return transaction, or not. In some embodiments, an indication of a determination whether to offer a coupon and which coupon terms to offer is provided to a clerk handling the return transaction. In some embodiments, a manager or other authorized merchant representative may override the determination for any of a variety of authorized reasons and may, for example, provide a coupon to a customer to whom the determination recommends not providing a coupon and/or altering to some extent the received terms of the coupon.

As will be familiar to one of skill in the art, other embodiments of the process 700 described in FIG. 7 may be carried out by executing the functions described in FIG. 7 in a different order, by dividing the functions in another manner, and/or by including some or all of the functions described above in conjunction with other associated functions.

Figure 8:
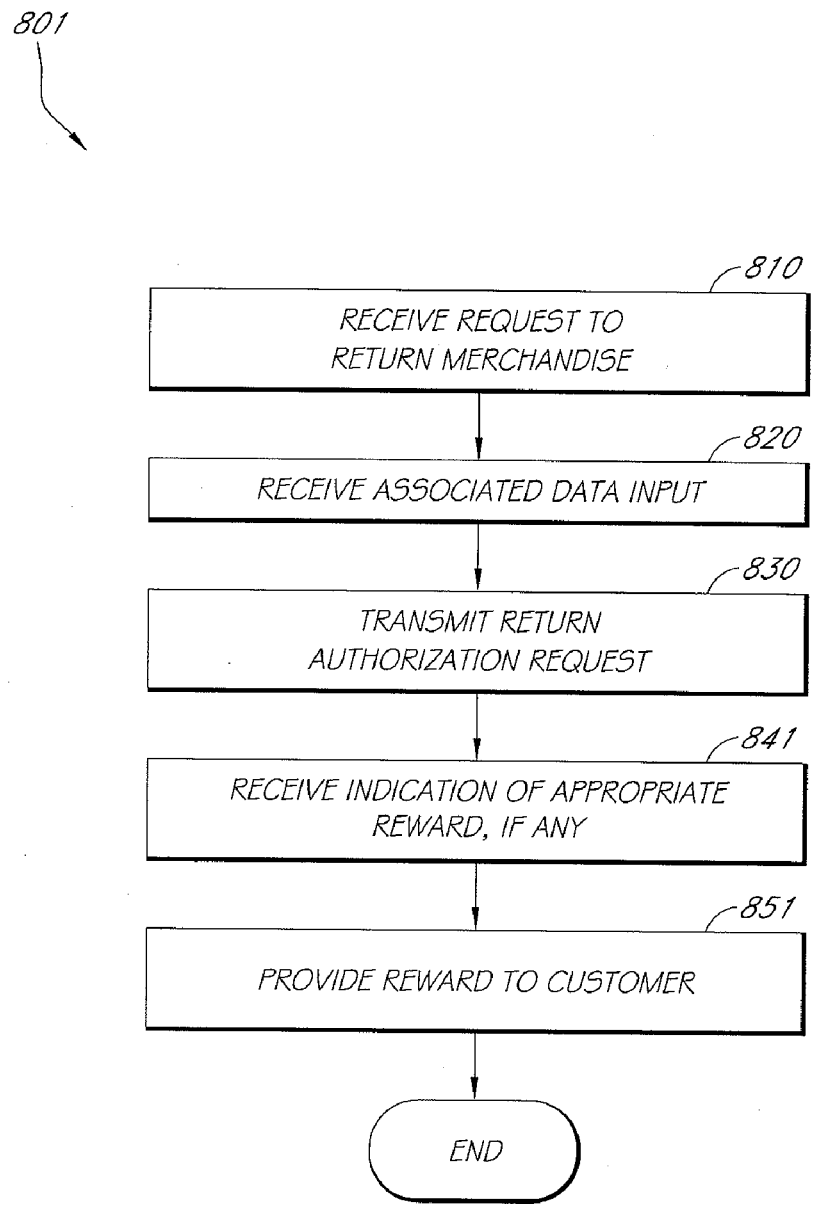
FIG. 8 is a flowchart that illustrates one embodiment of a process for providing a coupon to a customer at a point of return.

FIG. 8 is a flowchart that illustrates one embodiment of a process 801 for providing a coupon to a customer 110 at a point of return device 126.

In Block 810, the process 801 begins when the point of return (POR) device 126 receives a request for a merchandise return transaction.

In Block 820, data used for processing the requested merchandise return transactions is entered into the POR device 126, which may be a dedicated device or may be a device that is used for other purposes, as well, such as a point of sale terminal.

In Block 830, the POR device 126 transmits the entered data to the reward authorization service 100 for use in processing of the coupon determination. In some embodiments, other store-related data 128 available to the reward authorization service 100 that may have been received through other channels may also be used.

In Block 841, the POR device 126 receives an indication of an appropriate reward, if one has been identified for the merchandise return transaction.

In Block 851, the POR device 126 prints, or otherwise presents to the customer 110, the selected coupon or other reward. In some embodiments, where a point of sale terminal is being used as the POR device 126, the point of sale terminal may print the coupon or other reward. In other embodiments, in addition to or as an alternative to a coupon presented by the POR device 126, a coupon may be presented to the customer in any of a wide variety of other methods, including, but not limited to, printing, displaying, providing a verbal explanation, including in a store value card, electronically crediting the customer's account and the like. Furthermore, as will be familiar to one of skill in the art, other embodiments of the process 801 described in FIG. 8 may be carried out by executing the functions described in FIG. 8 in a different order, by dividing the functions in another manner, and/or by including some or all of the functions described above in conjunction with other associated functions.

Figure 9A:
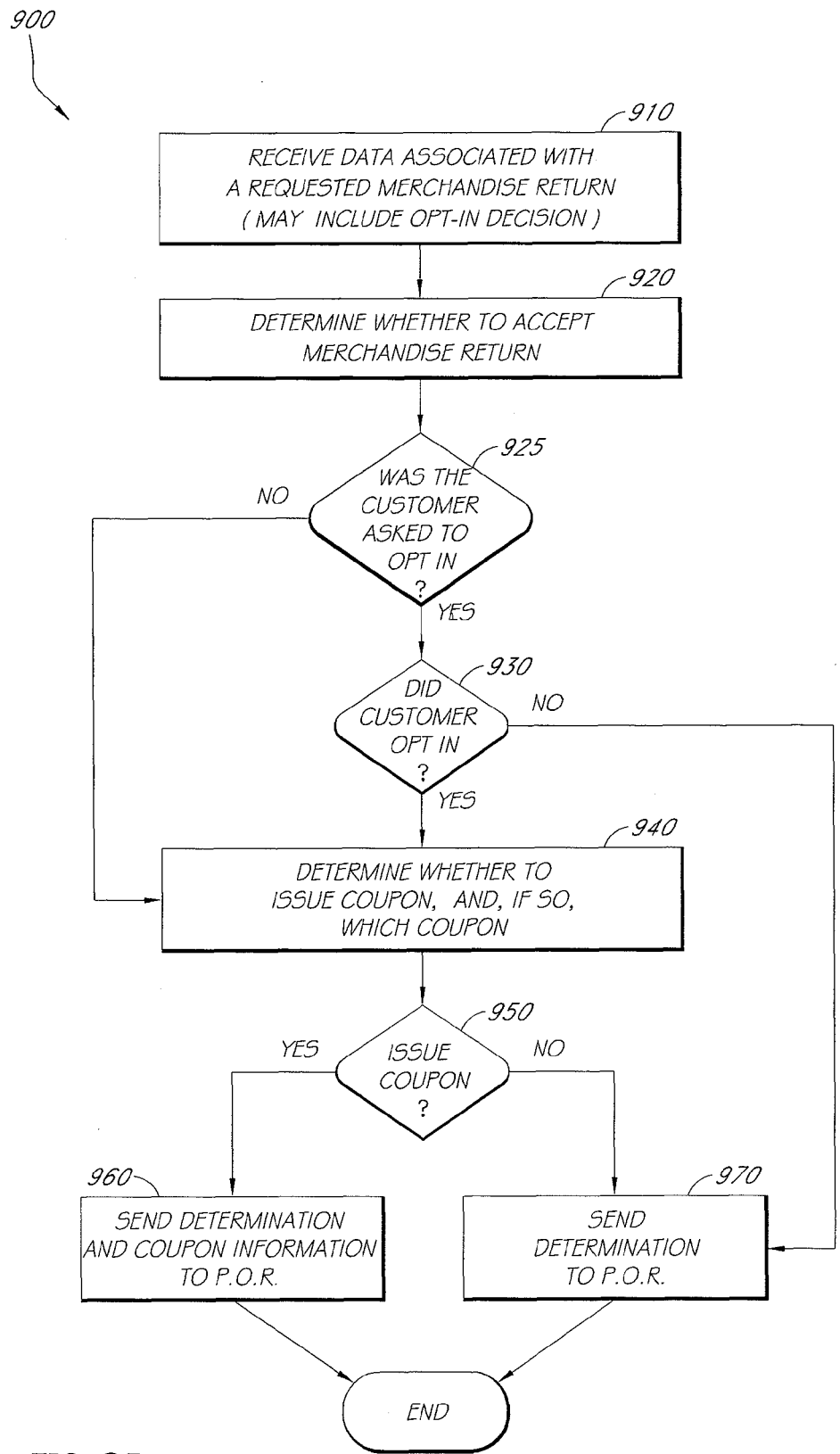
FIG. 9A is a flowchart that illustrates one embodiment of a process for determining whether to provide a coupon to a customer at a point of return that is carried out together with a return authorization determination.
Figure 9B:
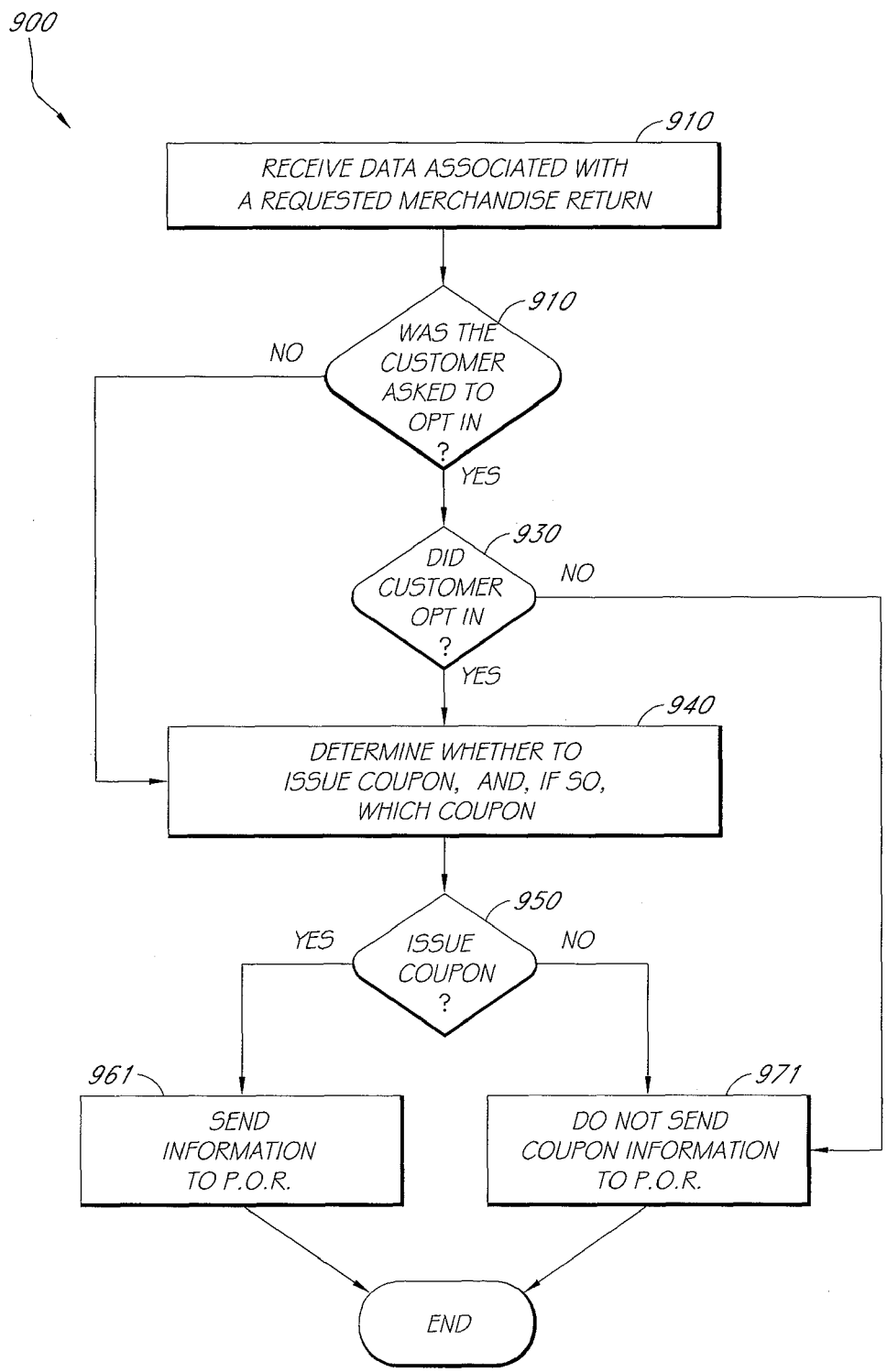
FIG. 9B is a flowchart that illustrates one embodiment of a process for determining whether to provide a coupon to a customer at a point of return.

FIGS. 9A and 9B are flowcharts that illustrate two embodiments of a process 900 for determining whether to provide a coupon to a customer 110 at a point of return 125, and, if so, which coupon to offer. The embodiment of the process 900 as described with respect to FIG. 9A makes the coupon-related determinations in association with a return authorization determination. The embodiment of the process 900 as described with respect to FIG. 9B makes the coupon-related determinations without being associated with a return authorization determination. In both FIGS. 9A and 9B, the process 900 is described as including an opportunity for the customer to "opt-in" to receive a coupon. However, as has been described above, in various embodiments, an "opting-in" aspect of the coupon-related system may be optional; other embodiments of the process 900 may be implemented without inclusion of an "opting-in" step on the part of the customer.

Describing now the embodiment of the process 900 as depicted in FIG. 9A, in Block 910, the merchandise return and reward authorization service 100 receives data associated with a requested merchandise return.

In Block 920, the merchandise return and reward authorization service 100 determines whether to recommend accepting the requested merchandise return. In particular, the merchandise return and reward authorization service 100 assesses the risk of authorizing the requested return transaction based, at least in part, on the received data, as well as on stored data that may include information about merchant return policies 150, information associated with the customer's past purchase and/or return transactions, information about the clerk, and any of a wide variety of other types of information. Thus, the return transaction determination may indicate that the requested return should be accepted or denied. The process 900 then passes to Block 925.

In Block 925, the process 900 determines whether the customer has been asked to opt-in to receive a coupon. If the customer has not been asked to opt-in, such as, for example, when opting-in to a reward program is not available or is not always implemented, the process 900 moves on to Block 940, and proceed as will be described below with reference to Block 940.

If, in Block 925, the process 900 determines that the customer has been about opting-in to a reward program, the process 900 moves on to Block 930.

In Block 930, the process 900 determines whether the customer has opted-in and is interested in receiving a coupon.

If, in Block 930, the process 900 determines that the customer is not interested in opting-in to receive a coupon, the process 900 passes to Block 970, where the merchandise return and reward authorization service 100 sends an indication of the return transaction determination, whether it is a rejection or an acceptance, to the POR device 126, and the process 900 ends.

If, instead, in Block 930, the process 900 determines that the customer does wish to receive a coupon, the process 900 passes to Block 940, where the merchandise return and reward authorization service 100, in conjunction with the reward qualifier 153, determines whether to issue a coupon, and if so, which coupon. For example, the process might determine, based on customer product preference information, that a small percentage discount for a general type of product that the customer has frequently purchased in the past may be sufficient incentive for the customer to make another purchase of that product type. As another example, the process might determine that the customer frequently returns apparel and that a coupon for the housewares department might more likely result in a sale of merchandise that is not later returned. As a further example, the process might determine that a currently ongoing promotional sale for swimwear is not generating the sales expected and that providing in-store customers with an additional discount for swimwear might boost sales of swimwear. These examples are provided to illustrate the fact that implementation of the reward-related determinations 650 may be customized to a high degree, if desired, to take customer preferences and/or merchant preferences into consideration.

From Block 940, the process 900 passes to Block 950 where, if the merchandise return and reward authorization service 100 determines to provide a coupon together with the merchandise return transaction determination, process 900 passes to Block 960 and the merchandise return and reward authorization service 100 sends to the POR device 126 the merchandise transaction determination along with a coupon for presenting to the customer 110, after which the process 900 ends.

If, in Block 950, the merchandise return and reward authorization service 100 determines not to provide a coupon together with the merchandise return transaction determination, the process 900 passes to Block 970 and the merchandise return and reward authorization service 100 sends to the POR device 126 the merchandise return transaction determination without a coupon. And the process 900 ends.

Describing now the embodiment of the process 900 as depicted in FIG. 9B, in which coupon determination is not associated with a return authorization determination, in Block 910, the reward authorization service 100 receives data associated with a requested merchandise return and then passes to Block 925.

In Block 925, the process 900 determines whether the customer has been asked to opt-in to receive a coupon. If the customer has not been asked to opt-in, such as, for example, when opting-in to a reward program is not available or is not always implemented, the process 900 moves on to Block 940, and proceed as will be described below with reference to Block 940.

If, in Block 925, the process 900 determines that the customer has been about opting-in to a reward program, the process 900 moves on to Block 930.

The process passes to Block 930, where the process 900 determines whether the customer opted-in and is interested in receiving a coupon.

If, in Block 930, the process 900 determines that the customer is not interested in opting-in to receive a coupon, the process 900 passes to Block 970, where the reward authorization service 100 does not send a coupon to the POR device 126, and the process 900 ends.

If, instead, in Block 930, the process 900 determines that the customer does wish to receive a coupon, or has not been asked to opt-in, the process 900 passes to Block 940, where the reward authorization service 100, in conjunction with the reward qualifier 153, determines whether to issue a coupon, and if so, which coupon. For example, the process might determine, based on customer product preference information, that a small percentage discount for a general type of product that the customer has frequently purchased in the past may be sufficient incentive for the customer to make another purchase of that product type. As another example, the process might determine that the customer frequently returns apparel and that a coupon for the house wares department might more likely result in a sale of merchandise that is not later returned. As a further example, the process might determine that a currently ongoing promotional sale for swimwear is not generating the sales expected and that providing in-store customers with an additional discount for swimwear might boost sales of swimwear. These examples are provided to illustrate the fact that implementation of the coupon-related determinations 650 may be customized to a high degree, if desired, to take customer preferences and/or merchant preferences into consideration.

From Block 940, the process 900 passes to Block 950 where, if the reward authorization service 100 determines to provide a coupon, process 900 passes to Block 961 and the reward authorization service 100 sends to the POR device 126 a coupon for presenting to the customer 110, after which the process 900 ends.

If, in Block 950, the reward authorization service 100 determines not to provide a coupon, the process 900 passes to Block 971 and the reward authorization service 100 does not send a coupon to the POR device 126.

As will be familiar to one of skill in the art, other embodiments of the process 900 described in FIGS. 9A and 9B may be carried out by executing the functions described in FIGS. 9A and 9B in a different order, by dividing the functions in another manner, and/or by including some or all of the functions described above in conjunction with other associated functions. For example, in some embodiments, the customer may be offered an opportunity to "opt-in" to receive coupons on a first requested return transaction, but, if the customer accepts, the customer may be assumed to continue to desire coupons on subsequent requested return transactions and may not be asked to "opt-in" again. Other variations with regard to opting-in may also be included in the systems and methods described herein. As another example, when authorization for a requested return transaction is denied, the system may determine that offering a coupon may serve as a "consolation prize" for the customer, attempting to make amends and generate customer loyalty for the store.

In other embodiments, the clerk, or the system, may issue a coupon to a customer to encourage the customer to keep the merchandise presented for return. This would bypass return authorization, if it is present in the embodiment, and go directly to coupon issuance. Also, a customer might be offered and instant discount for not returning (i.e., a discount applied to the price the customer already paid for the merchandise item.) In another embodiment, a customer might be offered both an instant discount and a coupon for another purchase if the customer decides not to return.

In some embodiments, the customer may be presented with a choice of terms of a coupon or other reward that may being offered. In some embodiments, the choice is offered on a computer screen or other digital display device, such as a touch screen device at a coupon kiosk that allow the customer to select among options before the reward is printed or otherwise presented to the customer.

In some embodiments, the clerk may be authorized to override a decision not to issue a coupon and may force the system to issue one. Furthermore, in some embodiments, the coupon may not be presented to the customer at the point of return, but may instead be mailed to the customer's home to encourage the customer to shop at the store on another occasion or may be otherwise presented to the customer.

While certain embodiments of the invention have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A computerized system for providing a reward incentive to a customer desiring to return merchandise to a merchant at a point of return, the system comprising:

a device operated by a clerk at a merchant facility, the device configured to receive information that identifies the clerk and the device further configured to receive information about a current merchandise return by a customer at a merchant's point of return within a merchant's physical location, wherein the current merchandise return comprises one or more items that the customer desires to return to the merchant for a credit and wherein the information about the merchandise return received by the device comprises whether the customer has a receipt associated with the purchase of the items the customer desires to return;

at least one database comprising return data wherein the return data comprises information about return history of prior merchandise returns associated with the return of one or more items by customers to merchants and wherein the database further comprises identification information about clerks handling previous returns and whether the clerks have made changes to the terms of previous reward incentives provided to customers; and at least one decision engine comprising computer hardware having one or more computer processors configured to perform a first analysis regarding a return authorization that determines whether to authorize the credit for the current merchandise return, wherein the decision engine is configured to receive the information about the current merchandise return by the customer and further configured to receive the return history from the database, the decision engine configured to determine whether to authorize the credit based on the return history, wherein the decision engine is further configured to communicate the return authorization of the credit to the device located in the merchant's facility, and wherein once the first analysis authorizes the credit based on the return history, the decision engine is further configured to perform a second analysis regarding whether to offer a reward incentive to the customer at the point of return, wherein the second analysis to offer the reward incentive is in addition to the first analysis for a return authorization such that the reward incentive is in addition to the credit given for the returned items, wherein the second analysis is based on information in addition to the return history;

wherein the decision engine analyzes customer identification data provided during the first analysis to create a customer identity that correlates the customer identity with external customer information obtained from one or more external data sources, the external customer information comprising at least a customer's address;

wherein the decision engine uses the customer's address associated with the external customer information to determine a geographical distance from a customer's address to the merchant facility where the merchandise return transaction occurs;

wherein the decision engine determines whether offer the reward incentive based on the geographical distance from the customer's address to the merchant facility the merchandise return transaction occurs;

wherein the decision engine further determines in the second analysis whether to offer the reward incentive based at the identification of the clerk and whether the clerk has made changes to the terms of previous reward incentives provided to the customer;

wherein the decision engine further determines in the second analysis whether to offer the reward incentive by comparing the home address of the clerk with the customer's address associated with the external customer information;

wherein the decision engine further determines in the second analysis the terms of the reward incentive based whether the customer has fraudulently used prior reward incentives;

wherein the decision engine further determines in the second analysis whether to offer the reward incentive based at least in part on the information about the current merchandise return, wherein the decision engine determines a reward incentive that provides a discount for different types of items than the items being returned by the customer, the decision engine identifies the different types of items based on customer product preference information about items that have been purchased by the customer in the past;

wherein the decision engine further determines in the second analysis whether to offer the reward incentive based at least in part on the authorization of the credit for the current merchandise return such that the reward incentive is different than the determination of the return authorization;

wherein the decision engine further determines in the second analysis whether to offer the reward incentive to the customer at the point of return based on the geographical distance from locations of previous returns made by the customer such that the reward incentive is different than the determination of the return authorization;

wherein the decision engine further determines in the second analysis whether to offer the reward incentive to the customer at the point of return based on the number of returns made by the customer with or without a receipt during a given period such that the reward incentive is different than the determination of the return authorization;

wherein the decision engine uses the return history of the customer to further determine in the second analysis whether to offer the reward incentive for types of products that the customer has not returned in the past;

wherein the decision engine further determines in the second analysis to reduce the amount of the reward incentive for the types of products that the customer has purchased in the past; and wherein the device indicates the return authorization of the credit and indicates the offer of the reward incentive such that the credit and the reward incentive are provided to the customer at the point of return within the merchant's physical location, and wherein the reward incentive incentivizes the customer to make a purchase with at least a portion of the credit before leaving the merchant's physical location.

2. The computerized system of claim 1 wherein the reward incentive is based at least in part on the age of the physical receipt.

3. The computerized system of claim 1 wherein the database further comprises information about the customer's profitability to the merchant and wherein the decision engine is further configured to determine whether to issue the reward incentive based at least in part on the customer's profitability to the merchant.

4. The computerized system of claim 1 wherein the reward incentive is based at least in part on whether the merchandise return is for a cash exchange.

5. The computerized system of claim 1 wherein the decision engine is further configured to determine at least one of the group consisting of value of the reward incentive, a percentage discount offered by the reward incentive, a dollar discount offered by the reward incentive, an expiration time, an expiration date, at least one eligible product, at least one eligible product category, at least one eligible store location for reward incentive redemption, at least one retailer who is not the merchant, whether or not the reward incentive may be used online or in a physical store or both, and at least one eligible department for reward incentive redemption.

6. The computerized system of claim 1 wherein the reward incentive is customized based at least in part on the geographic distance from locations of recent returns or the geographic distance from the customer's home.

7. The computerized system of claim 1 wherein the reward incentive is valid for at least one of the group consisting of a predetermined time period, for less than a day, for one hour, for a time period between one hour and a day, for exchanges, current purchases and future purchases of merchandise offered by the merchant.

8. The computerized system of claim 1 further comprising a database of merchant return authorization policies and wherein the decision engine is further configured to determine whether to issue a reward incentive based at least in part on the merchant return authorization policies set by a retailer or a manufacturer.

9. The computerized system of claim 1 wherein the decision engine is further configured to determine whether to issue a reward incentive based at least in part on the amount of recent returns, and the number of returns made by the customer in a geographical area during a given period.

10. The computerized system of claim 1 wherein the decision engine is further configured to determine whether to issue a reward incentive based at least in part on at least one of the group consisting of SKU identifier of the item being returned, merchant identifier, inventory, merchandise mix, mix of sales by SKU identifier, mix of inventory by SKU identifier, store sales performance, store profitability, average sale amount for the store, average return amount for the store, current reward incentives, current sales promotions, store location, and local demographics.

\* \* \* \* \*

UNITED STATES PATENT AND TRADEMARK OFFICE
CERTIFICATE OF CORRECTION

| | |
|---|---|
| PATENT NO. | : 8,355,946 B2 |
| APPLICATION NO. | : 11/691458 |
| DATED | : January 15, 2013 |
| INVENTOR(S) | : Mark S. Hammond and Peter L. Bradshaw |

It is certified that error appears in the above-identified patent and that said Letters Patent is hereby corrected as shown below:

In the Drawings

At reference numeral 410, FIG, 4, please change "Millitary" to --Military--.

In the Specification

In column 2, line 19, please change "technologies" to --technologies.--.

In the Claims

In column 27, line 43, in Claim 1, please change "offer" to --to offer--.

Signed and Sealed this
Fifth Day of August, 2014

Michelle K. Lee
*Deputy Director of the United States Patent and Trademark Office*